(12) United States Patent
Hashimoto

(10) Patent No.: US 9,274,942 B2
(45) Date of Patent: Mar. 1, 2016

(54) INFORMATION PROCESSING SYSTEM AND NONVOLATILE STORAGE UNIT

(75) Inventor: Daisuke Hashimoto, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 443 days.

(21) Appl. No.: 13/235,394

(22) Filed: Sep. 18, 2011

(65) Prior Publication Data

US 2012/0246388 A1 Sep. 27, 2012

(30) Foreign Application Priority Data

Mar. 22, 2011 (JP) ................................. 2011-063282

(51) Int. Cl.
*G06F 12/02* (2006.01)

(52) U.S. Cl.
CPC ..... *G06F 12/0246* (2013.01); *G06F 2212/7209* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 8,386,537 B2 | 2/2013 | Boyd et al. | |
| 8,533,391 B2 * | 9/2013 | Song et al. | 711/117 |
| 2008/0263305 A1 | 10/2008 | Shu et al. | |
| 2009/0292839 A1 * | 11/2009 | Oh | 710/55 |
| 2010/0169553 A1 | 7/2010 | Yano et al. | |
| 2010/0172189 A1 | 7/2010 | Itagaki et al. | |
| 2010/0205354 A1 | 8/2010 | Suzuki | |
| 2010/0217927 A1 * | 8/2010 | Song et al. | 711/103 |
| 2010/0250829 A1 | 9/2010 | Stenfort | |
| 2010/0254191 A1 | 10/2010 | Son et al. | |
| 2011/0018051 A1 | 1/2011 | Kim et al. | |

(Continued)

FOREIGN PATENT DOCUMENTS

| | | |
|---|---|---|
| JP | 9-97139 | 4/1997 |
| JP | 2010-157133 | 7/2010 |

(Continued)

OTHER PUBLICATIONS

Office Action issued Jul. 16, 2013 in Japanese Application No. 2011-063282 (With English Translation).

(Continued)

*Primary Examiner* — Charles Rones
*Assistant Examiner* — Ryan Dare
(74) *Attorney, Agent, or Firm* — Oblon, McClelland, Maier & Neustadt, L.L.P.

(57) ABSTRACT

According to one embodiment, a memory system includes a nonvolatile storage device and an information processing apparatus. The information processing apparatus includes a first control circuit configured to send a delete notification to the nonvolatile storage device to invalidate data in a first logical address area when read data corresponding to the first logical address area is the same as data expressed by a first function. The nonvolatile storage device include a nonvolatile storage medium, a management table configured to associate a logical address corresponding to valid data for the nonvolatile storage device with a physical address, and a second control circuit configured to update the management table to invalidate a logical address designated by the delete notification, and to send the data expressed by the first function to the information processing apparatus when a logical address included in a read instruction received from the information processing apparatus is invalid.

20 Claims, 40 Drawing Sheets

(56) References Cited

U.S. PATENT DOCUMENTS

| | | |
|---|---|---|
| 2011/0145306 A1 | 6/2011 | Boyd et al. |
| 2011/0271037 A1 | 11/2011 | Oh et al. |
| 2012/0054465 A1 | 3/2012 | Post et al. |
| 2012/0144097 A1 | 6/2012 | Hashimoto |
| 2012/0221776 A1 | 8/2012 | Yoshihashi et al. |
| 2012/0246393 A1 | 9/2012 | Hashimoto |
| 2012/0254514 A1 | 10/2012 | Nishikubo |
| 2012/0260025 A1 | 10/2012 | Hida et al. |

FOREIGN PATENT DOCUMENTS

| | | |
|---|---|---|
| JP | 2010-161199 | 7/2010 |
| JP | 2011-29586 | 2/2011 |
| JP | 5405513 B2 | 2/2014 |
| WO | WO 2008/063647 A2 | 5/2008 |

OTHER PUBLICATIONS

Information Technology-SCSI Block Commands-3(SBC-3), T10/BRS INCITS 514, Revision 35, Published Dec. 7, 2012, <http://www.t10.org/> 1 front page, pp. 162-166.

NVM Express Revision 1.1, published Oct. 2012, <http://www.nvmexpress.org/>, 1 front page, pp. 114-117.

"7.9 Data Set Management—06h, DMA", INCITS T13, Information Technology ATA/ATAPI Command Set-2 (ACS-2), T13/2015-D, Revision 5, http://www.t13.org/, Feb. 8, 2011, pp. 98-99.

Frank Shu et al., "Data Set Management Commands Proposal for ATA8—ACS2", INCITS T13/e07154r6, Revision 6, http://www.t13.org/documents/uploadeddocuments/docs2008/e07154r6-Data_Set_Management_Proposal_for_ATA-ACS2.pdf, Dec. 12, 2007, pp. 1-7.

Fred Knight, "TRIM—DRAT / RZAT clarifications for ATA8—ACS2", Trim Clarifications, T13/e09158r2, Revision 2, Feb. 23, 2010, pp. 1-6.

Office Action issued Aug. 8, 2014, in Japanese Patent Application No. 2013-224797 with English translation.

Office Action issued Jul. 24, 2015 in Japanese Patent Application No. 2014-228225 (with English translation).

Office Action issued Oct. 16, 2015 in Japanese Patent Application No. 2014-228225 filed Dec. 8, 2014 with English Translation.

* cited by examiner

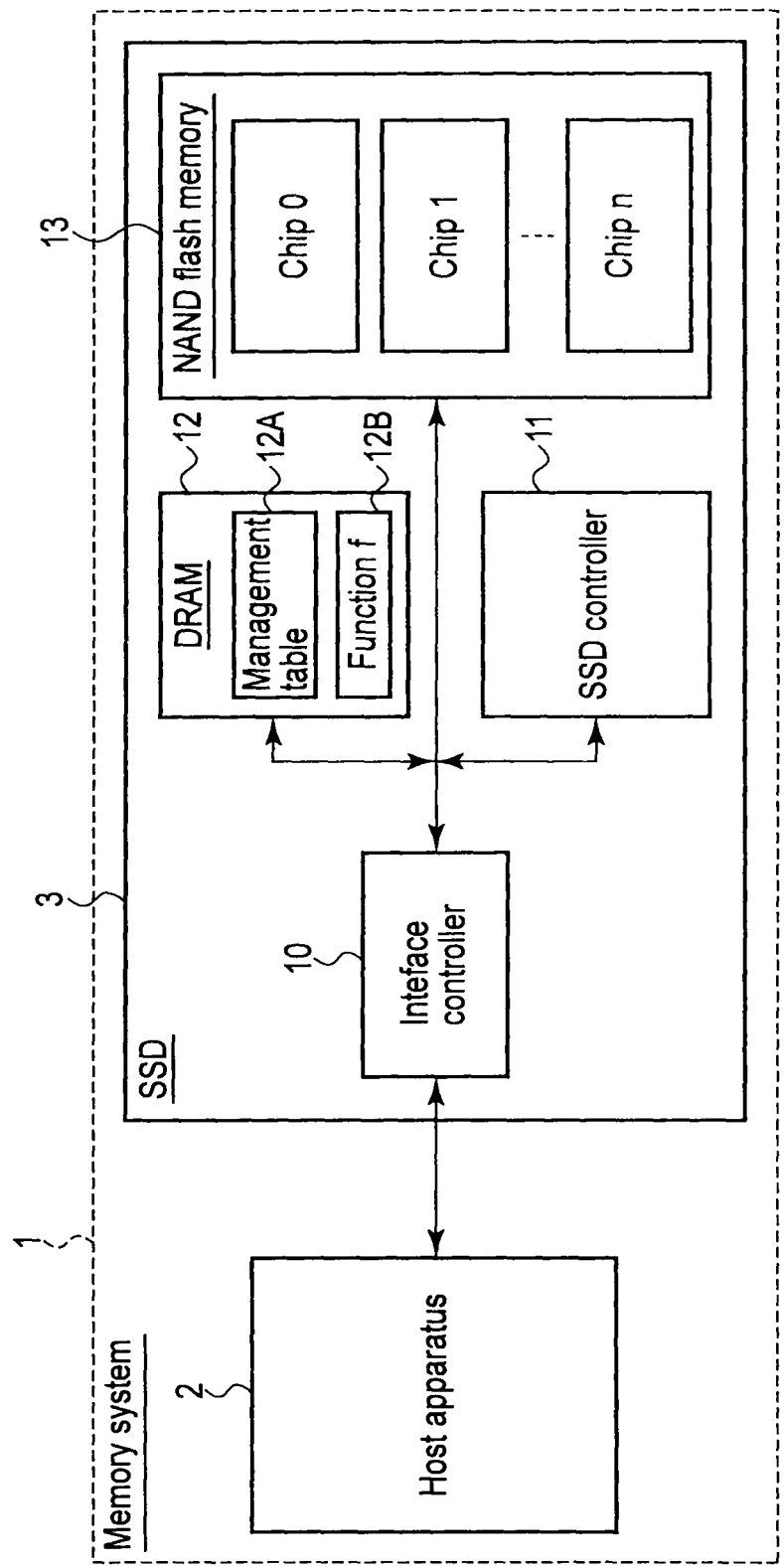
F I G. 1

Management table 12A

Free block table

| Physical block ID |
| --- |
| ... |
| ... |
| ... |
| ... |

Active block table

| Logical address | Physical block ID |
| --- | --- |
| ... | ... |
| ... | ... |
| ... | ... |
| ... | ... |

Active page table

| Logical address | Physical block ID | Physical page address |
| --- | --- | --- |
| ... | ... | ... |
| ... | ... | ... |
| ... | ... | ... |
| ... | ... | ... |

FIG. 2

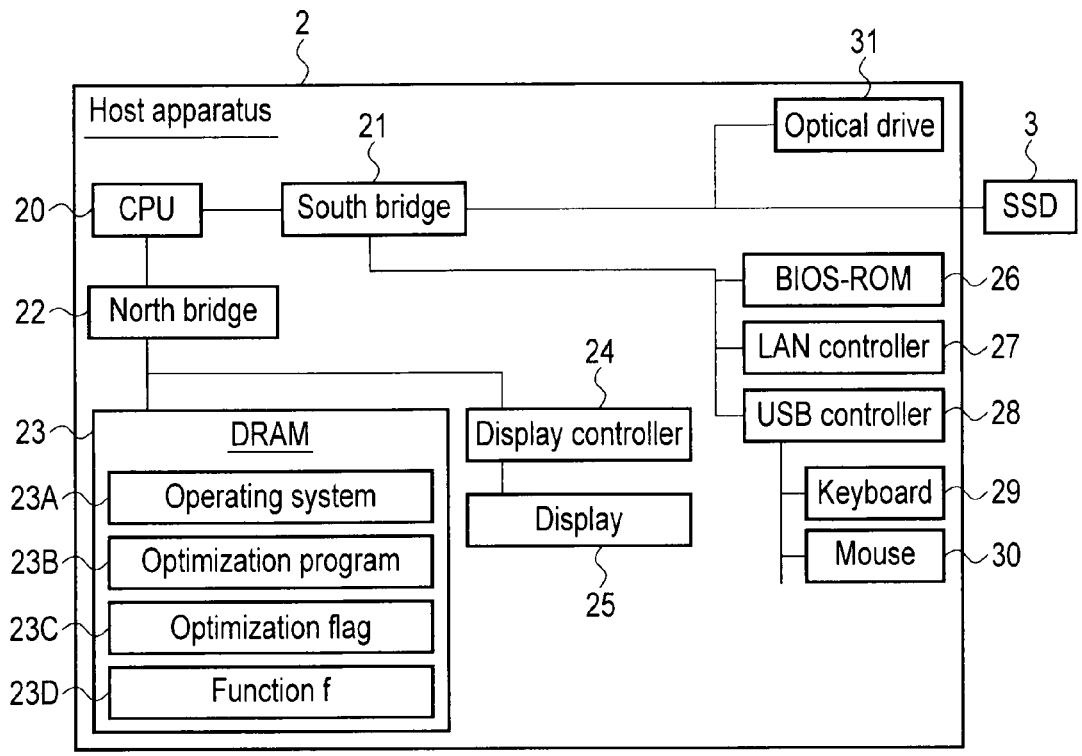
F I G. 3
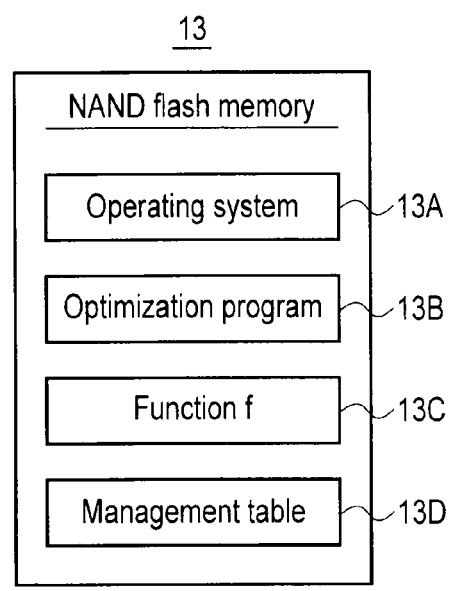
F I G. 4

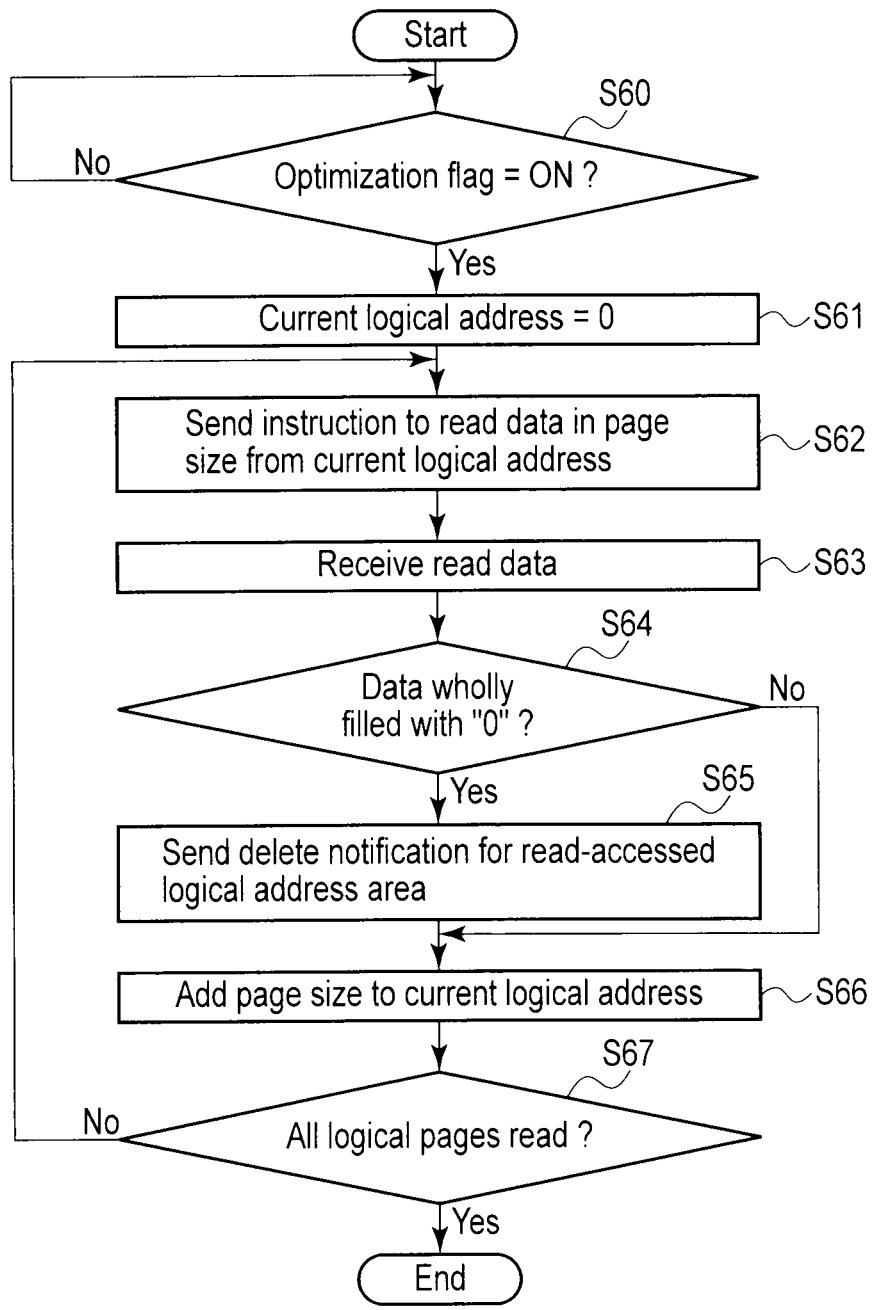
F I G. 11

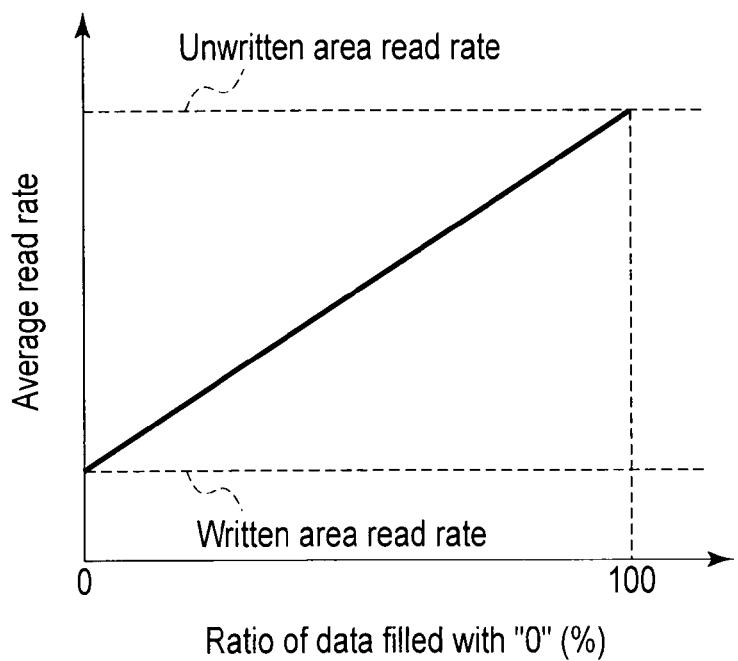
F I G. 1 4
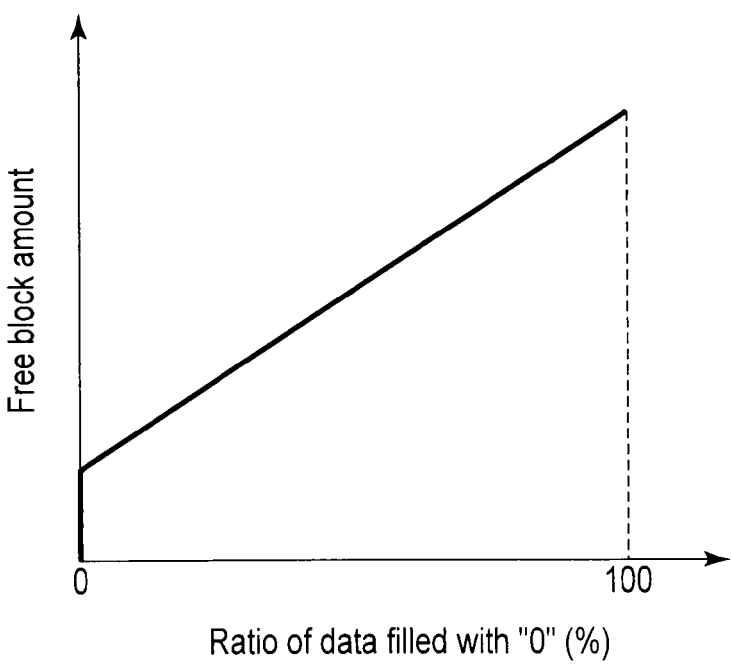
F I G. 1 5

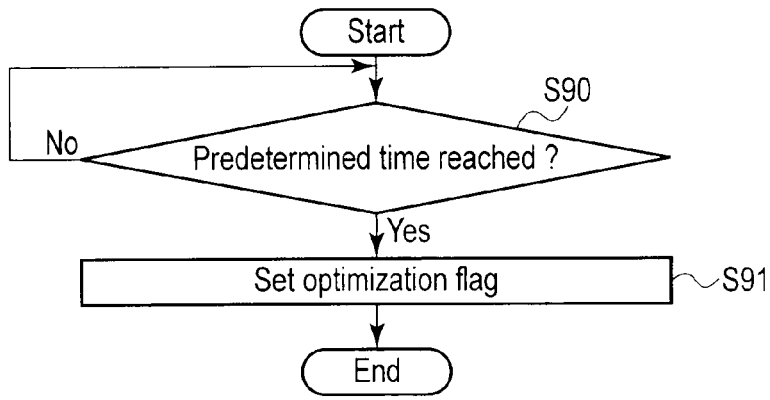
F I G. 17
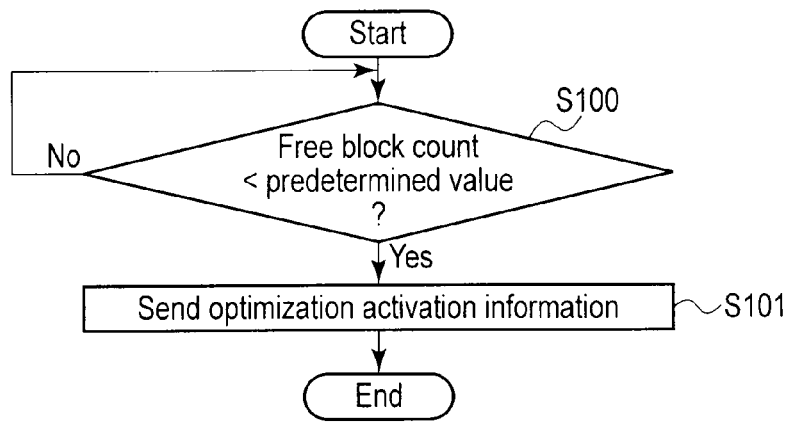
F I G. 18
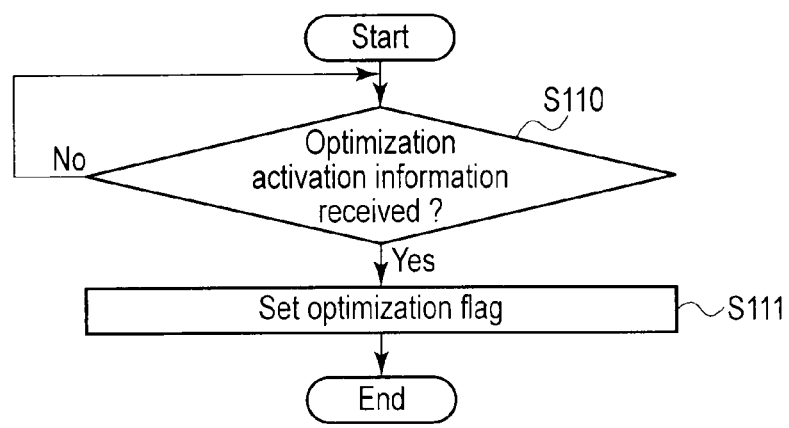
F I G. 19

12A

Management table

Free block table

| Physical block ID |
|---|
| ... |
| ... |
| ... |
| ... |

Active block table

| Logical address | Physical block ID |
|---|---|
| ... | ... |
| ... | ... |
| ... | ... |
| ... | ... |

Active page table

| Logical address | Physical block ID | Physical page address | Optimized mark |
|---|---|---|---|
| ... | ... | ... | ... |
| ... | ... | ... | ... |
| ... | ... | ... | ... |
| ... | ... | ... | ... |

F I G. 22

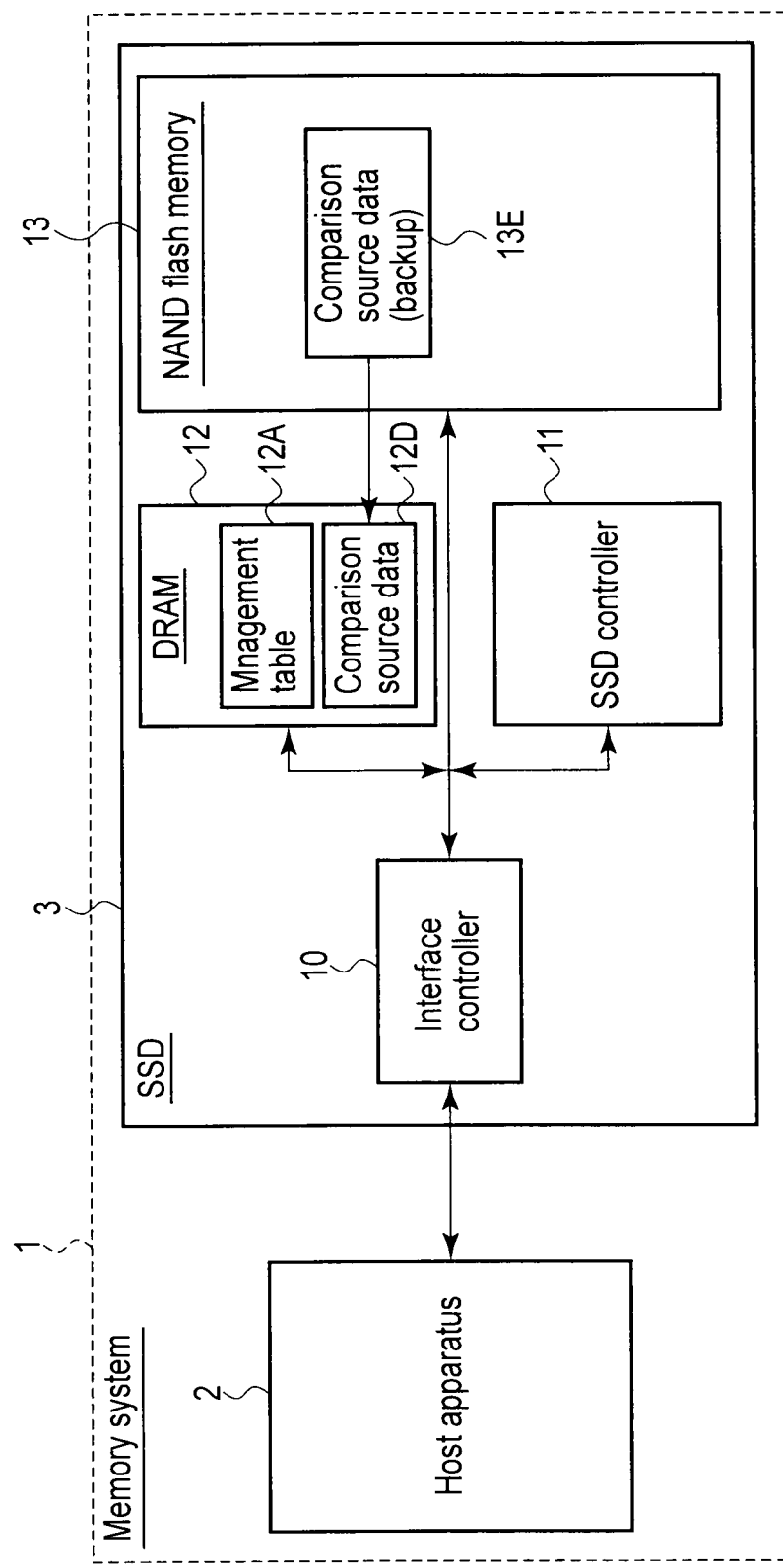
F I G. 24

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFFh |
| 1000h | 0h |
| 1000h | 1h |
| ⋮ | ⋮ |
| 1000h | FFFh |
| 1001h | 0h |
| ⋮ | ⋮ |
| 1001h | FFFh |

Rows with block ID 0h through FFFh: Physical address of NAND flash memory

Rows with block ID 1000h through 1001h: Physical address of comparison source data area on DRAM

F I G. 2 5

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFFh |
| 1000h | 0h |

Rows with block ID 0h through FFFh: Physical address of NAND flash memory

Row with block ID 1000h: Physical address of comparison source data area on DRAM

F I G. 2 6

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFFh |
| 1000h | 0h |
| 1000h | 1h |
| ⋮ | ⋮ |
| 1000h | FFFh |
| 1001h | 0h |
| ⋮ | ⋮ |
| 1001h | FFFh |

} Physical address of NAND flash memory (rows 0h–FFFh)

} Physical address of comparison source data area on SSD controller (rows 1000h–1001h)

FIG. 28

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFFh |
| 1000h | 0h |

} Physical address of NAND flash memory (rows 0h–FFFh)

Physical address of comparison source data area on SSD controller (row 1000h)

FIG. 29

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFDh |
| FFFh | FFEh |
| FFFh | FFFh |

Physical address of NAND flash memory (0h/0h through FFFh/FFDh)

Physical address of comparison source data area (FFFh/FFEh and FFFh/FFFh)

F I G. 3 1

| Physical block ID | Physical page address |
|---|---|
| 0h | 0h |
| 0h | 1h |
| 0h | 2h |
| ⋮ | ⋮ |
| 0h | FFFh |
| 1h | 0h |
| 1h | 1h |
| ⋮ | ⋮ |
| FFFh | FFEh |
| FFFh | FFFh |

Physical address of NAND flash memory (0h/0h through FFFh/FFEh)

Physical address of comparison source data area (FFFh/FFFh)

F I G. 3 2

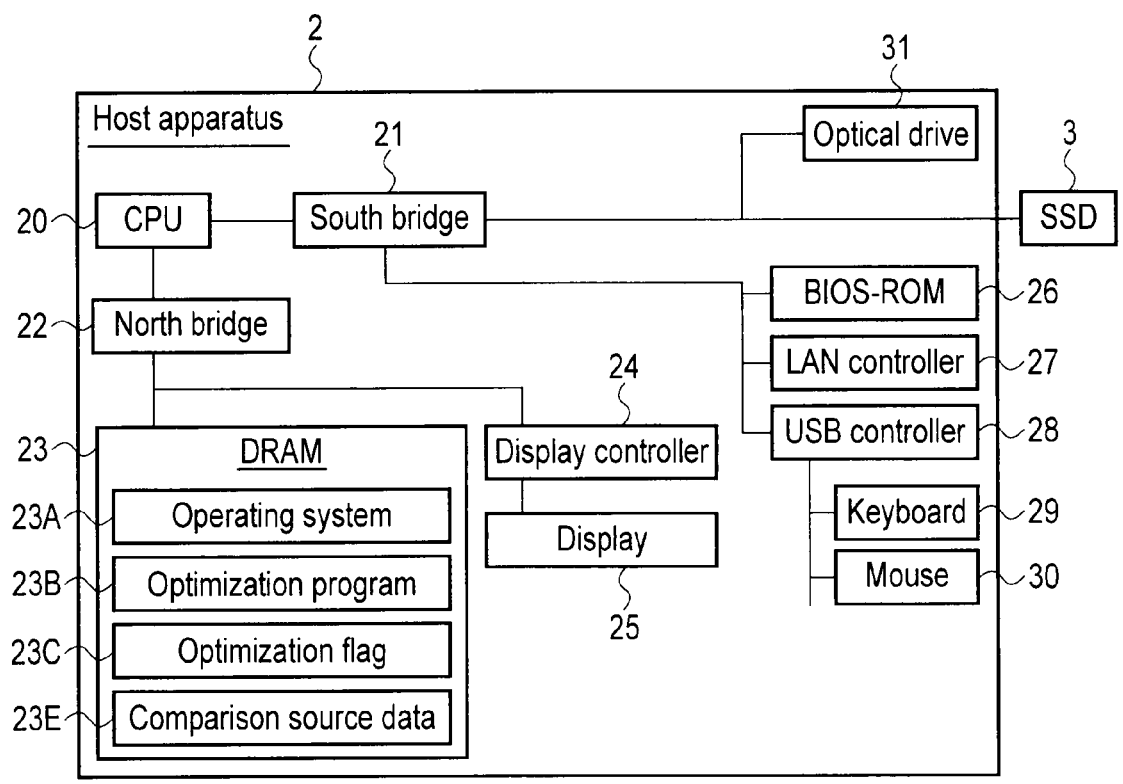
F I G. 3 3

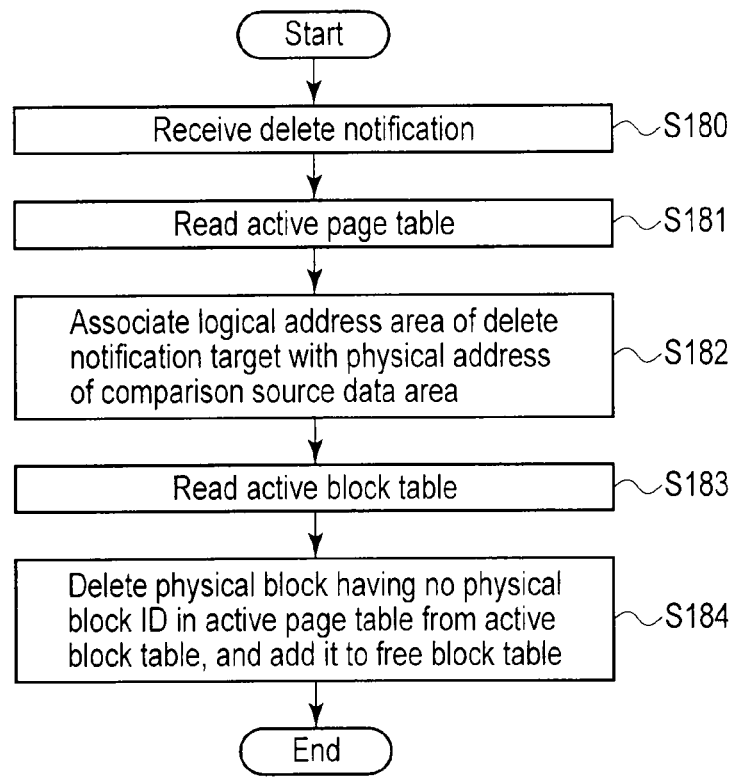
F I G. 3 5
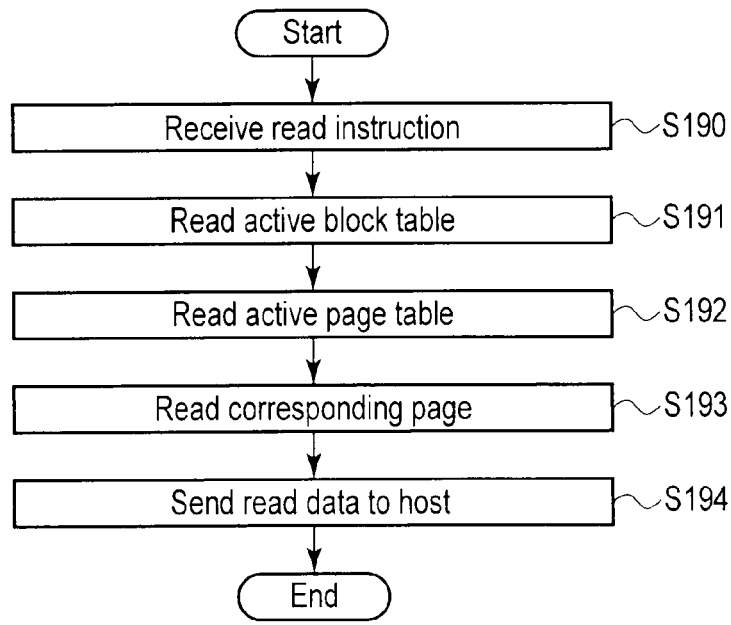
F I G. 3 6

| LBA | Data |
|---|---|
| 0000h | 5ab543cd3763··· |
| 0001h | e564a641b763··· |
| 0002h | 000000000000··· |
| 0003h | 348957987908··· |
| 0004h | 000000000000··· |
| 0005h | 000000000000··· |
| 0006h | 000000000000··· |
| 0007h | 349058349058··· |
| ⋮ | ⋮ |
| ba02h | 954683f5484c··· |
| ba03h | 000000000000··· |
| ba04h | 000000000000··· |
| ba05h | 000000000000··· |
| ⋮ | ⋮ |
| ffffh | 000000000000··· |
ba03h – ffffh: All zero
1 sector (=512 bytes)
F I G. 4 2
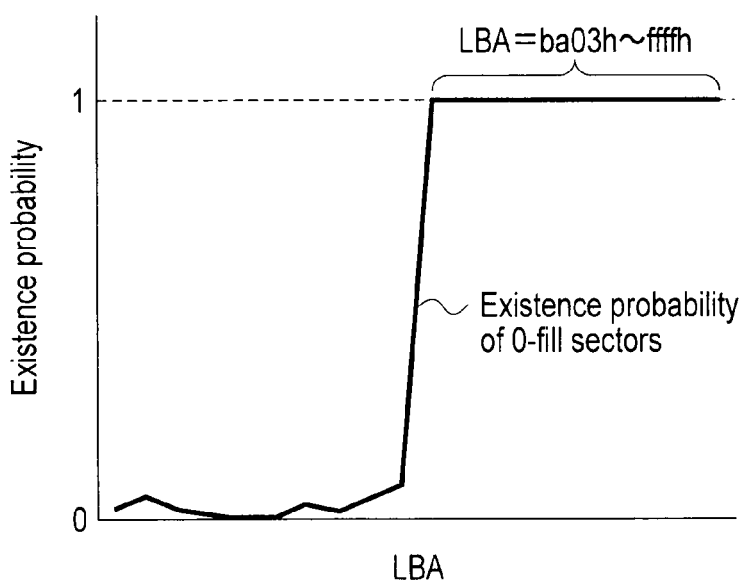
F I G. 4 3

| LBA | Data |
|---|---|
| 0000h | 5ab543cd3763··· |
| 0001h | e564a641b763··· |
| 0002h | 000000000000··· |
| 0003h | 348957987908··· |
| 0004h | 000000000000··· |
| 0005h | 348957987908··· |
| 0006h | 000000000000··· |
| 0007h | 349058349058··· |
| ⋮ | ⋮ |
| c000h | 954683f5484c··· |
| c001h | ffffffffffff··· |
| c002h | ffffffffffff··· |
| c003h | 349058349058··· |
| ⋮ | ⋮ |
| ffffh | ffffffffffff··· |
Existence probability of 0-fill sectors is higher (rows 0000h–c000h)
Existence probability of 1-fill sectors is higher (rows c001h–ffffh)
F I G. 4 4
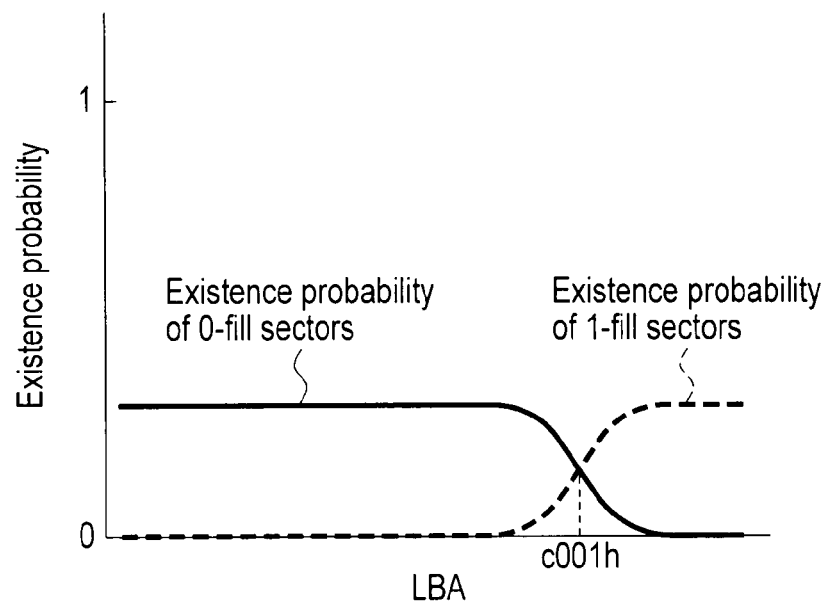
F I G. 4 5

| LBA | Data | |
|---|---|---|
| 0000h | 5ab543cd3763··· | ⎫ |
| 0001h | e564a641b763··· | ⎪ |
| 0002h | 000000000000··· | ⎪ Existence probability of |
| 0003h | 348957987908··· | ⎬ 0-fill sectors is higher |
| 0004h | 000000000000··· | ⎪ |
| 0005h | 348957987908··· | ⎪ |
| 0006h | 000000000000··· | ⎪ |
| 0007h | 349058349058··· | ⎭ |
| ⋮ | ⋮ | |
| 8000h | 954683f5484c··· | ⎫ |
| 8001h | 320a320a320a··· | ⎪ Existence probability of |
| 8002h | 320a320a320a··· | ⎬ 320a-fill sectors is higher |
| 8003h | 320a320a320a··· | ⎪ |
| ⋮ | ⋮ | |
| c000h | 954683f5484c··· | ⎭ |
| c001h | ffffffffffff··· | ⎫ |
| c002h | ffffffffffff··· | ⎪ Existence probability of |
| c003h | 349058349058··· | ⎬ 1-fill sectors is higher |
| ⋮ | ⋮ | ⎪ |
| ffffh | ffffffffffff··· | ⎭ |

| LBA | Data | |
|---|---|---|
| 0000h | 5ab543cd3763⋯65183 | |
| 0001h | e564a641b763⋯ab552 | |
| 0002h | 000000000000⋯00002 | Correlated |
| 0003h | 348957987908⋯00003 | Correlated |
| 0004h | 000000000000⋯00004 | Correlated |
| 0005h | 000000000000⋯00005 | Correlated |
| 0006h | 000000000000⋯00006 | Correlated |
| 0007h | 349058349058⋯ | |
| ⋮ | ⋮ | |
| ba02h | 954683f5484c⋯86213 | Correlated |
| ba03h | 000000000000⋯0ba03 | Correlated |
| ba04h | 000000000000⋯0ba04 | Correlated |
| ba05h | 000000000000⋯0ba05 | Correlated |
| ⋮ | ⋮ | |
| ffffh | 000000000000⋯0ffff | Correlated |
F I G. 4 8
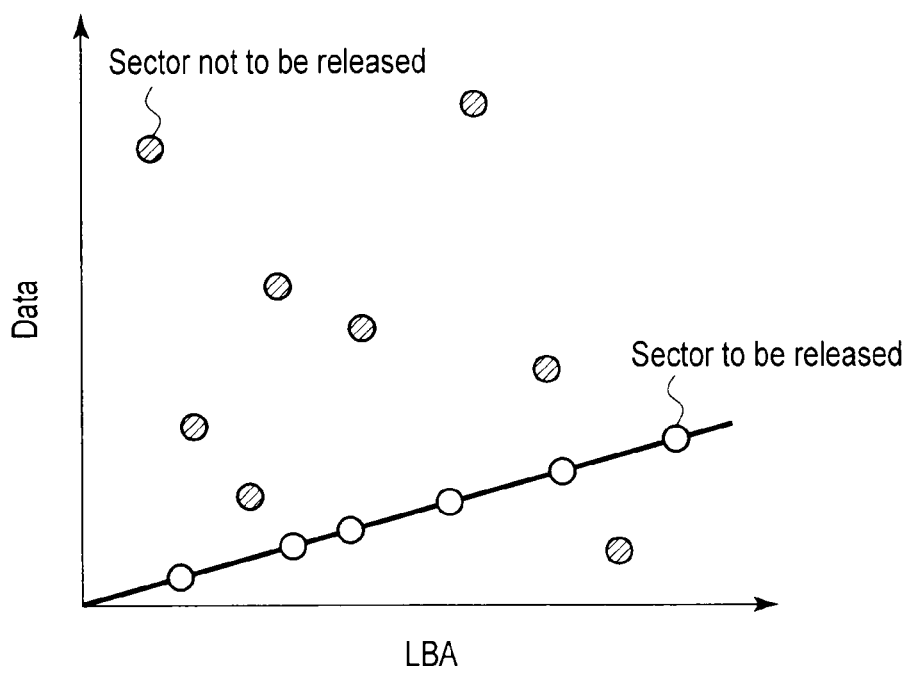
F I G. 4 9

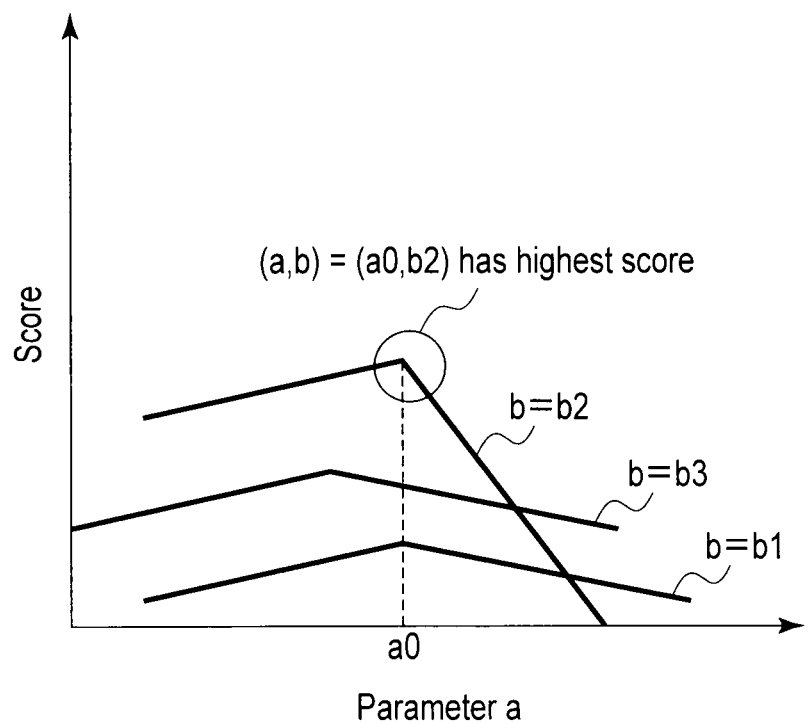
F I G. 5 0

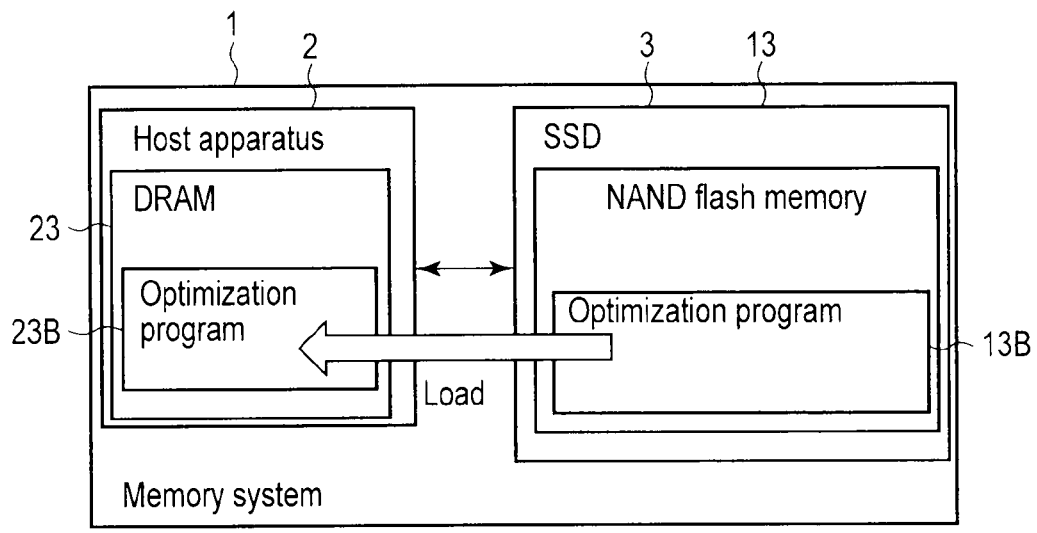
F I G. 5 1
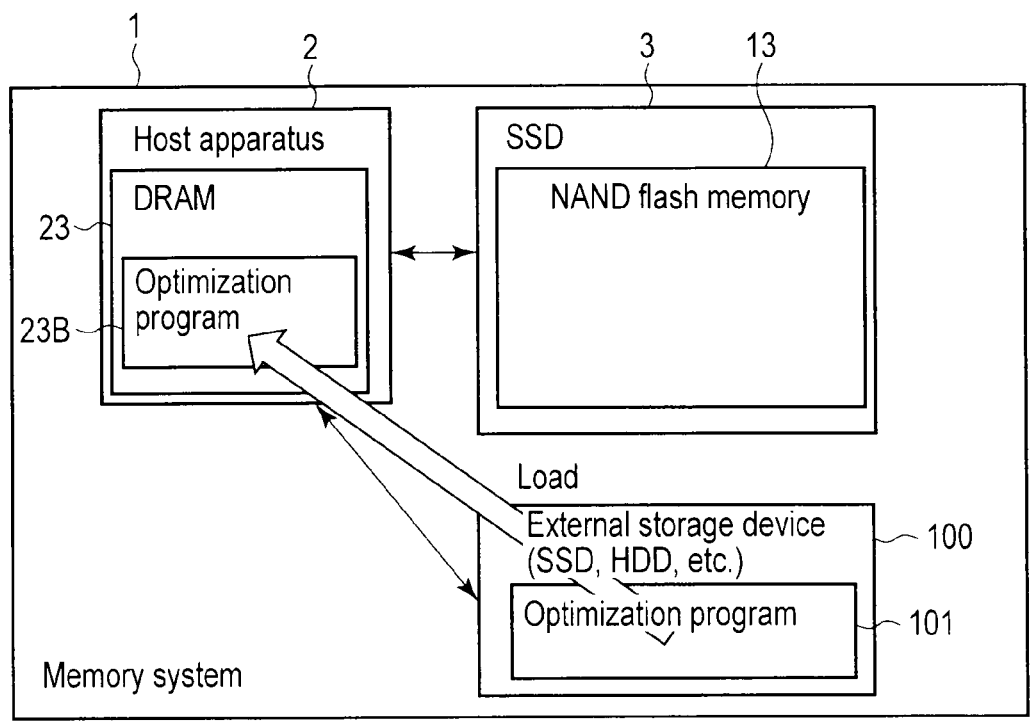
F I G. 5 2

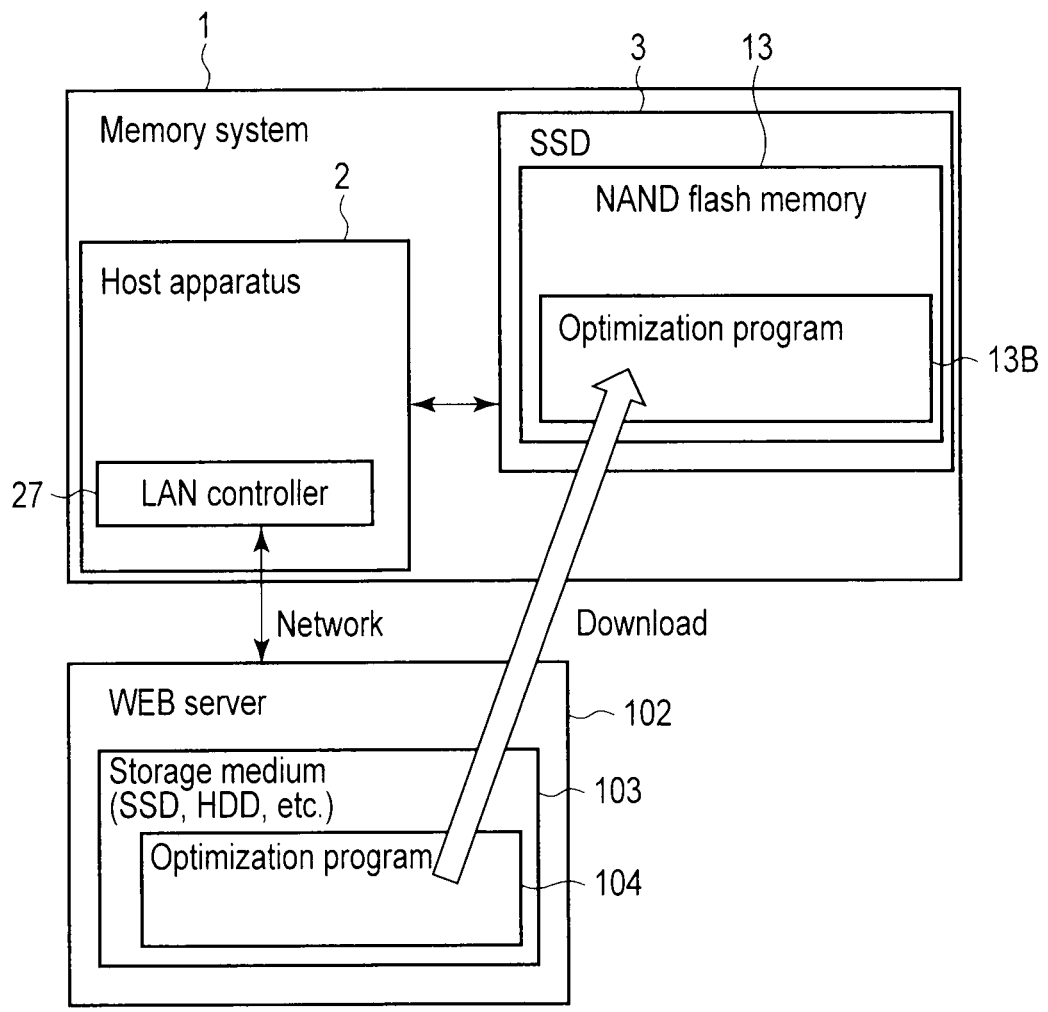
F I G. 5 3

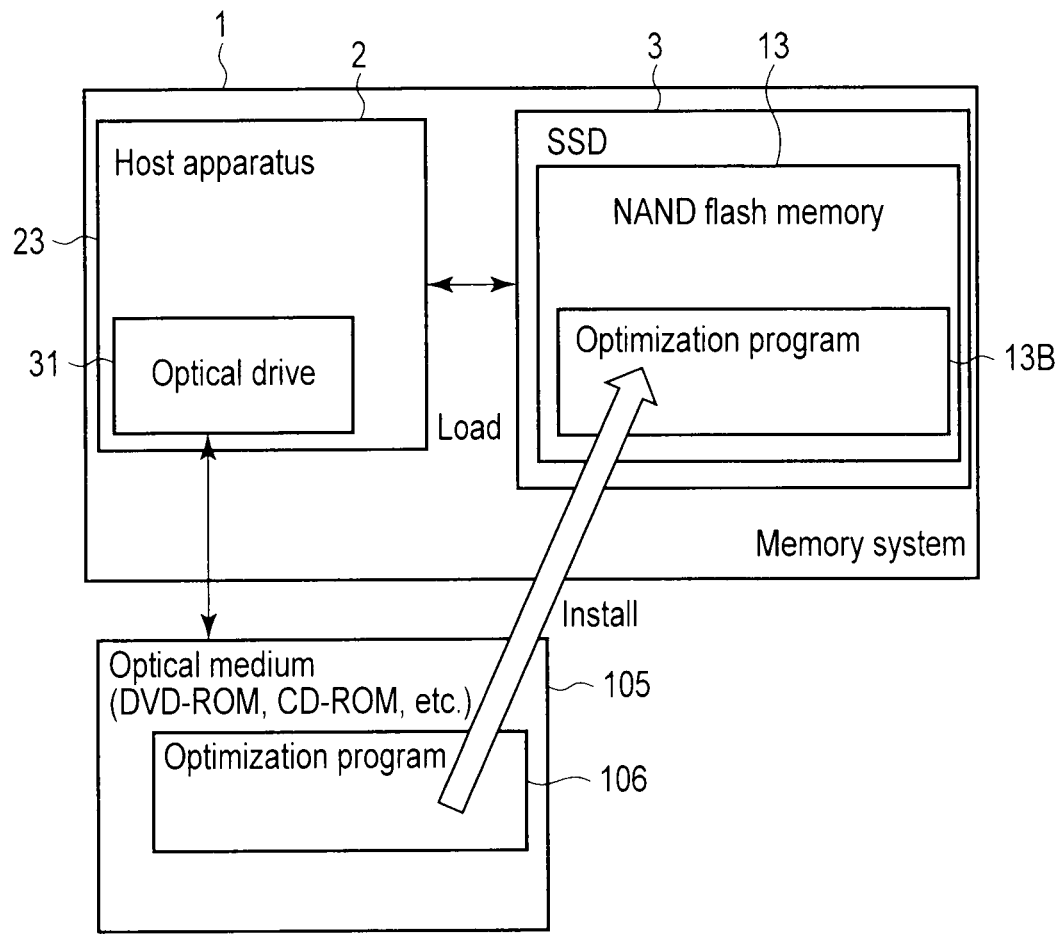
F I G. 5 4

INFORMATION PROCESSING SYSTEM AND NONVOLATILE STORAGE UNIT

CROSS-REFERENCE TO RELATED APPLICATIONS

This application is based upon and claims the benefit of priority from prior Japanese Patent Application No. 2011-063282, filed Mar. 22, 2011, the entire contents of which are incorporated herein by reference.

FIELD

Embodiments described herein relate generally to a memory system, a nonvolatile storage device, a control method, and a computer-readable medium.

BACKGROUND

There is a method of, when deleting file data in an external storage device (for example, an HDD (Hard Disk Drive) or an SSD (Solid State Drive)) on an operating system (OS), deleting only data management information on the OS without actually erasing data from the external storage device. Delete processing is not always performed in the external storage device for every data delete on the OS. The absence of delete processing leads to improved performance of the operation of the external storage device. This method is particularly effective in an HDD of slow access speed.

On the other hand, the data that should have been deleted on the OS is recognized as valid data on the external storage device (this data is called host-invalid and device-valid data). For this reason, the free area on the external storage device where no data exists is smaller than that recognized by the OS. Exhaustion of the free area on the external storage device may pose a serious problem especially in an SSD in which logical addresses and physical addresses do not necessarily have a one-to-one correspondence.

BRIEF DESCRIPTION OF THE DRAWINGS

FIG. 1 is a block diagram of a memory system according to the first embodiment;
FIG. 2 is a view for explaining part of a management table;
FIG. 3 is a block diagram of a host apparatus according to the first embodiment;
FIG. 4 is a view for explaining part of data stored in a NAND flash memory;
FIG. 11 is a flowchart illustrating optimization processing of the host apparatus;
FIG. 14 is a graph showing the relationship between the average read rate and the ratio of data filled with "0";
FIG. 15 is a graph showing the relationship between the free block amount and the ratio of data filled with "0";
FIG. 17 is a flowchart illustrating optimization flag setting processing of a host apparatus according to the third embodiment;
FIG. 18 is a flowchart illustrating optimization activation information generation processing of an SSD according to the fourth embodiment;
FIG. 19 is a flowchart illustrating optimization flag setting processing of a host apparatus;
FIG. 22 is a view for explaining part of a management table;
FIG. 24 is a block diagram of a memory system in which a comparison source data area is allocated on a DRAM;
FIG. 25 is a view for explaining a physical address mapping table;
FIG. 26 is a view for explaining a physical address mapping table;
FIG. 28 is a view for explaining a physical address mapping table;
FIG. 29 is a view for explaining a physical address mapping table;
FIG. 31 is a view for explaining a physical address mapping table;
FIG. 32 is a view for explaining a physical address mapping table;
FIG. 33 is a block diagram of a host apparatus according to the seventh embodiment;
FIG. 35 is a flowchart illustrating delete notification processing of the SSD;
FIG. 36 is a flowchart illustrating the read operation of the SSD;
FIG. 42 is a view showing an example of logical addresses and data according to Example 1;
FIG. 43 is a graph showing the existence probability distribution of 0-fill sectors;
FIG. 44 is a view showing an example of logical addresses and data according to Example 2;

FIG. 45 is a graph showing the existence probability distribution of 0-fill sectors and the existence probability distribution of 1-fill sectors;

FIG. 48 is a view showing an example of logical addresses and data according to Example 6;

FIG. 49 is a graph for explaining sectors released by optimization processing;

FIG. 50 is a graph for explaining a method of deciding a function f according to Example 7;

FIG. 51 is a block diagram for explaining an optimization program storage form;

FIG. 52 is a block diagram for explaining an optimization program storage form;

FIG. 53 is a block diagram for explaining an optimization program storage form;

FIG. 54 is a block diagram for explaining an optimization program storage form.

DETAILED DESCRIPTION

Figure 5:
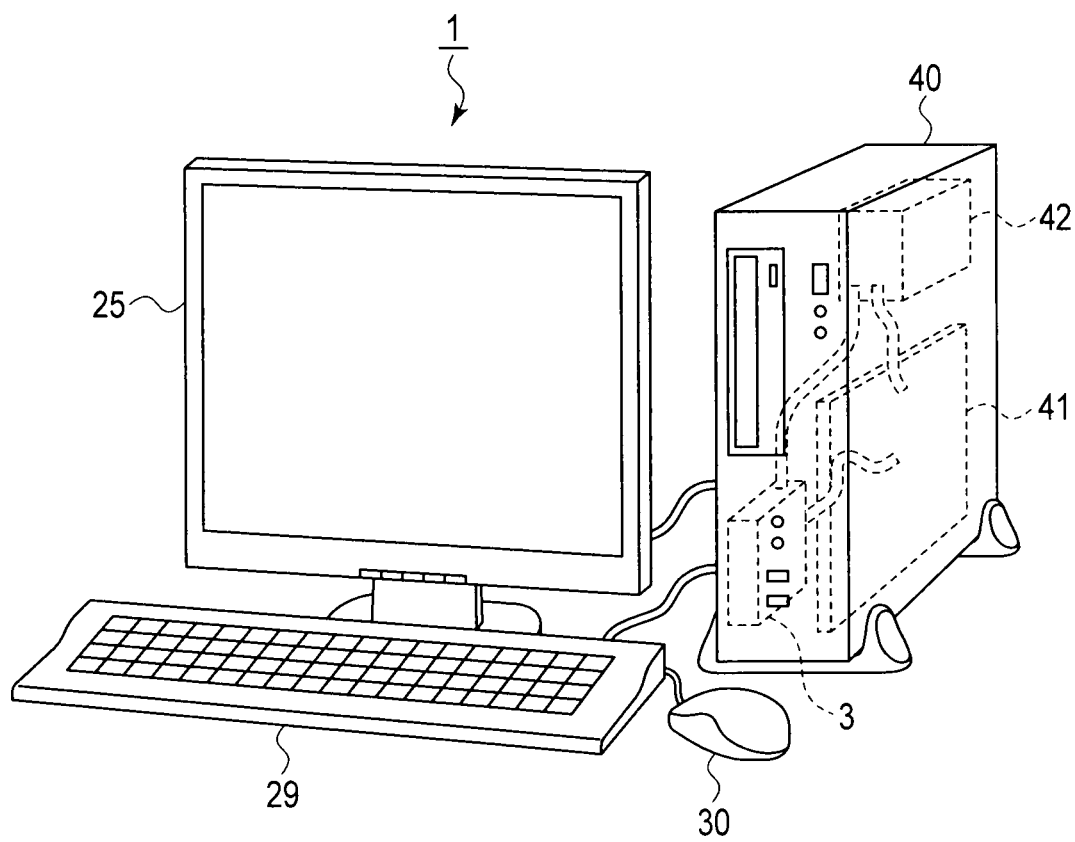
FIG. 5 is a schematic view of a desktop computer.

In general, according to one embodiment, there is provided a memory system including a nonvolatile storage device and an information processing apparatus that communicates with the nonvolatile storage device, the information processing apparatus comprising a first control circuit configured to read data from a first logical address area of the nonvolatile storage device, and to send a delete notification to the nonvolatile storage device to invalidate the data in the first logical address area when the read data corresponding to the first logical address area is the same as data expressed by a first function, and the nonvolatile storage device comprising:

a nonvolatile storage medium;

a management table configured to associate a logical address corresponding to valid data for the nonvolatile storage device with a physical address; and a second control circuit configured to update the management table to invalidate a logical address designated by the delete notification, and to send the data expressed by the first function to the information processing apparatus when a logical address included in a read instruction received from the information processing apparatus is invalid.

In the case of exhaustion of the free area on an SSD, that is, exhaustion of the physical blocks (free blocks) of a NAND flash memory recognized by an SSD controller to have no device-valid data, if write is performed for the SSD, device-invalid data areas are searched for on the physical blocks (active blocks) of the NAND flash memory recognized by the SSD controller to have device-valid data, and the device-valid data are arranged (NAND arrangement) to allocate a new free block. This processing imposes a heavy load and considerably degrades the write performance.

If write is performed when the NAND flash memory includes many device-invalid data, that is, the free area on the SSD has been exhausted, write concentrates in a specific area, or the NAND flash memory performs an extra delete in a NAND arrangement that frequently takes place. This may greatly lower the reliability of the SSD.

Invalid data and valid data are defined by the following.

"host-invalid and device-valid data": the data invalid for the host and valid for the SSD controller.

"host-valid and device-valid data": the data valid for both the host and the SSD controller.

"host-valid and device-invalid data": the data valid for the host and invalid for the SSD controller.

"host-invalid and device-invalid data": the data invalid for both the host and the SSD controller.

"host-valid data": the data valid at least for host.

"host-invalid data": the data invalid at least for the host.

"device-valid data": the data valid at least for the SSD controller.

"device-invalid data" the data invalid at least for the SSD controller.

The embodiments will now be described with reference to the accompanying drawings. Several embodiments below explain apparatuses and methods for embodying the technical concept of the present invention. The technical concept of the present invention is not limited by the shapes, structures, and layouts of the constituent components. Note that in the following explanation, the same reference numerals denote elements having the same functions and arrangements, and a repetitive explanation will be made only when necessary.

[First Embodiment]

[1. Arrangement of Memory System]

FIG. 1 is a block diagram of a memory system 1 according to the first embodiment. The memory system 1 comprises a host apparatus (information processing apparatus) 2 and a nonvolatile storage device 3 serving as an external storage device. In this embodiment, an SSD (Solid State Drive) will be exemplified as the nonvolatile storage device 3.

The SSD 3 comprises an interface controller 10, an SSD controller (control circuit) 11, a DRAM 12 serving as a main memory, a NAND flash memory 13 serving as a nonvolatile storage medium, and a bus that connects them.

The interface controller 10 executes interface processing to the host apparatus 2. The interface controller 10 is connected to the host apparatus 2 by a communication interface complying with, for example, the SATA (Serial Advanced Technology Attachment) standard, and executes interface processing complying with the SATA standard. The interface standard need not always be SATA, and SAS (Serial Attached SCSI), USB (Universal Serial Bus), or the like may also be used.

The SSD controller 11 controls various kinds of operations of the entire SSD 3. The SSD controller 11 reads a program stored in the NAND flash memory 13 to the DRAM 12 and executes predetermined processing to create various kinds of tables on the DRAM 12. The SSD controller 11 also receives a write instruction, a read instruction, an erase instruction, and the like from the host apparatus 2, and executes predetermined processing for the NAND flash memory 13 in response to these instructions.

The NAND flash memory 13 includes (n+1) NAND memory chips Chip0 to Chipn, where n is an integer of 0 or more. The NAND memory chips Chip0 to Chipn may be configured to be able to operate in parallel. Each NAND memory chip comprises a memory cell array including a plurality of flash memory cells and peripheral circuits (for example, a row decoder, a column decoder, a page buffer, and a data cache). The memory cell array of the NAND flash memory 13 includes a plurality of blocks. Each block includes a plurality of pages. A block is the minimum unit of data erase. A page is the minimum unit of data write/read.

Each memory cell transistor included in the memory cell array of the NAND flash memory 13 is formed from a MOS-FET (Metal Oxide Semiconductor Field Effect Transistor)

having a stacked gate structure formed on a semiconductor substrate. The stacked gate structure includes a charge storage layer (floating gate electrode) formed on a gate insulating film on the semiconductor substrate, and a control gate electrode formed on an intergate insulating film on the floating gate electrode. The memory cell transistor changes the threshold voltage in accordance with the number of electrons stored in the floating gate electrode, and stores data based on the difference in the threshold voltage. The memory cell transistor can be configured to store either 1-bit data or multivalued data (data of 2 bits or more). The memory cell transistor need not always have the structure with a floating gate electrode, and may adopt a structure such as MONOS (Metal-Oxide-Nitride-Oxide-Silicon) that can adjust the threshold voltage by trapping electrons in the nitrided interface serving as the charge storage layer. A MONOS-type memory cell transistor can also be configured to store either 1-bit data or multivalued data. The nonvolatile storage medium may be a semiconductor storage medium including three-dimensionally arranged memory cells as described in U.S. Patent Application Publication No. 2010-0172189 or U.S. Patent Application Publication No. 2010-0254191.

The DRAM 12 functions as the data transfer cache between the host apparatus 2 and the NAND flash memory 13 and the working memory of the SSD controller 11. The working memory of the DRAM 12 stores a management table and a function f read from the NAND flash memory 13 upon activation. The DRAM 12 includes a storage area 12A that stores the management table, and a storage area 12B that stores the function f. The management table and the function f will be explained later in detail. A memory other than the DRAM may be used as the main memory. A random access memory (RAM) is preferably used as the main memory. Besides the DRAM, an SRAM, an FeRAM (Ferroelectric Random Access Memory), an MRAM (Magnetoresistive Random Access Memory), a PCRAM (Phase Change Random Access Memory) or the like may be used as the main memory. The main memory can be mounted on an SSD substrate as a standalone chip or incorporated in the SSD controller as an embedded memory.

FIG. 2 is a view for explaining part of the management table stored on the DRAM 12. When the host apparatus 2 sends an instruction to the SSD 3, the instruction is sent to the SSD controller 11 via the interface controller 10. The SSD controller 11 processes the received instruction. At this time, the SSD controller 11 converts the logical address received from the host apparatus 2 into a physical address by looking up the management table on the DRAM 12. A logical address is an address managed in the host apparatus 2, and a physical address is an actual address managed in the SSD 3.

As shown in FIG. 2, the management table includes a free block table, an active block table, and an active page table. A physical block ID and a physical page address are included in a physical address. The active block table manages physical block IDs and logical addresses in association with each other. A physical block (active block) registered in the active block table holds valid data at least for the SSD controller 11 (device-valid data). The free block table manages physical blocks that are not associated with logical addresses. A physical block (free block) registered in the free block table holds no device-valid data because it is not associated with a logical address.

The active page table manages physical page addresses and logical addresses in association with each other. A physical page (active page) registered in the active page table holds valid data at least for the SSD controller 11 (device-valid data). A physical page registered in the active page table is associated with the physical block ID to which the physical page belongs. Note that each logical address managed on the management table is an address having the minimum data size manageable in the SSD 3 or a larger data size.

The arrangement of the host apparatus 2 will be described next. FIG. 3 is a block diagram of the host apparatus 2. A CPU (control circuit) 20 is the central processing unit of the host apparatus 2. The CPU 20 performs various kinds of arithmetic processing and control in the host apparatus 2. The CPU 20 controls the SSD 3 or an optical drive 31 such as a DVD-ROM via a south bridge 21. The CPU 20 controls a DRAM 23 serving as the main memory via a north bridge 22.

The user controls the host apparatus 2 via an input device such as a keyboard 29 or a mouse 30. A signal from the keyboard 29 or the mouse 30 is processed by the CPU 20 via a USB (Universal Serial Bus) controller 28 and the south bridge 21. The CPU 20 sends image data or text data to a display (display device) 25 via the north bridge 22 and a display controller 24. The user can visually recognize the image data or text data from the host apparatus 2 via the display 25.

The CPU 20 executes the BIOS (Basic Input/Output System) stored in a BIOS-ROM 26. The BIOS is a program for hardware control. In addition, the CPU 20 controls a LAN (Local Area Network) controller 27 via the south bridge 21.

The DRAM 23 functions as the working memory of the CPU 20, and includes a storage area 23A that stores the OS (Operating System), a storage area 23B that stores an optimization program, a storage area 23C that stores an optimization flag, and a storage area 23D that stores the function f. As is generally known, the OS is a program that manages the whole host apparatus 2 by, for example, managing the input/output devices of the host apparatus 2, managing the disk and the memory, and controlling to allow software to use the hardware of the host apparatus 2. Details of the optimization program and the optimization flag will be described later. In the power-off state of the host apparatus 2, the OS, the optimization program, and the function f are stored in the NAND flash memory 13 of the SSD 3, as shown in FIG. 4. They are loaded from the NAND flash memory 13 to the DRAM 23 upon activating the host apparatus 2 or the program. The NAND flash memory 13 includes a storage area 13A that stores the OS, a storage area 13B that stores the optimization program, a storage area 13C that stores the function f, and a storage area 13D that stores the management table. The NAND flash memory 13 also includes a storage area (not shown) that stores user data.

An example of the arrangement of the memory system 1 will be described next. The memory system 1 can be implemented as, for example, a desktop computer or a notebook type portable computer. FIG. 5 is a schematic view of a desktop computer serving as the memory system 1.

The desktop computer 1 comprises an information processing apparatus main body 40, the display 25, the keyboard 29, the mouse 30, and the like. The information processing apparatus main body 40 comprises a motherboard 41 including main hardware, the SSD 3, a power unit 42, and the like. The SSD 3 is physically connected to the motherboard 41 via a SATA cable and electrically connected to the CPU 20 mounted on the motherboard 41 via the south bridge mounted on the motherboard 41. The power unit 42 generates various kinds of power to be used in the desktop computer 1 and supplies the power to the motherboard 41 and the SSD 3 via power cables.

Figure 6:
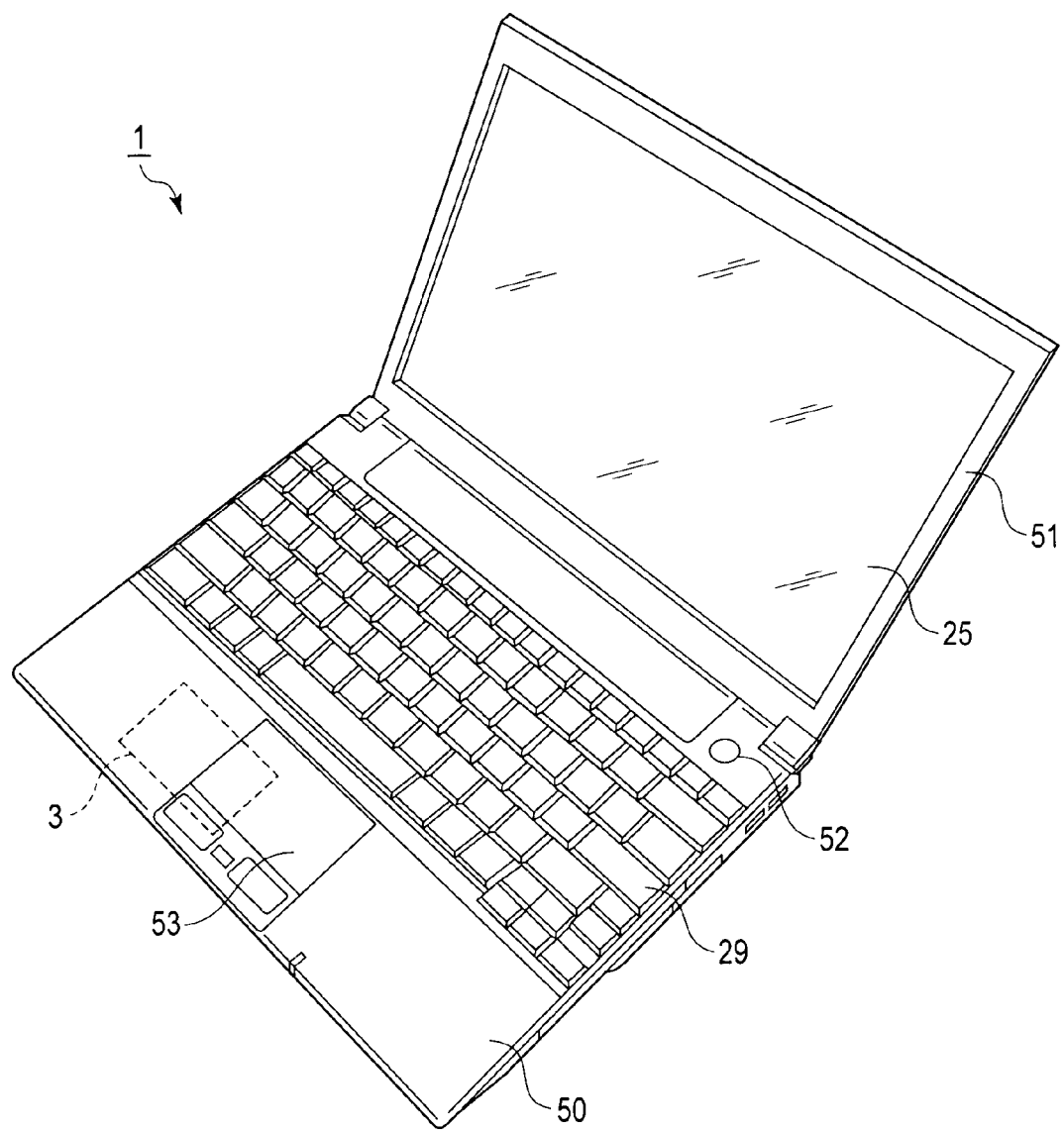
FIG. 6 is a schematic view of a portable computer.

FIG. 6 is a schematic view of a portable computer serving as the memory system 1. The portable computer 1 includes an information processing apparatus main body 50 and a display unit 51. The display unit 51 incorporates the display device 25 formed from, for example, an LCD (Liquid Crystal Display).

The display unit 51 is attached to the information processing apparatus main body 50 so as to freely pivot between the open position where the upper surface of the main body 50 is exposed and the closed position where the upper surface of the main body 50 is covered. The main body 50 has a thin box-shaped case, and includes a power switch 52, the keyboard 29, a touch pad 53, and the like on its upper surface. Like the desktop computer, the main body 50 also includes the SSD 3, the motherboard, and the power unit.

The memory system 1 may be an image capturing apparatus such as a still camera or a video camera, or a game machine or a car navigation system.

[2. Operation]

<2-1. Write Operation>

Figure 7:
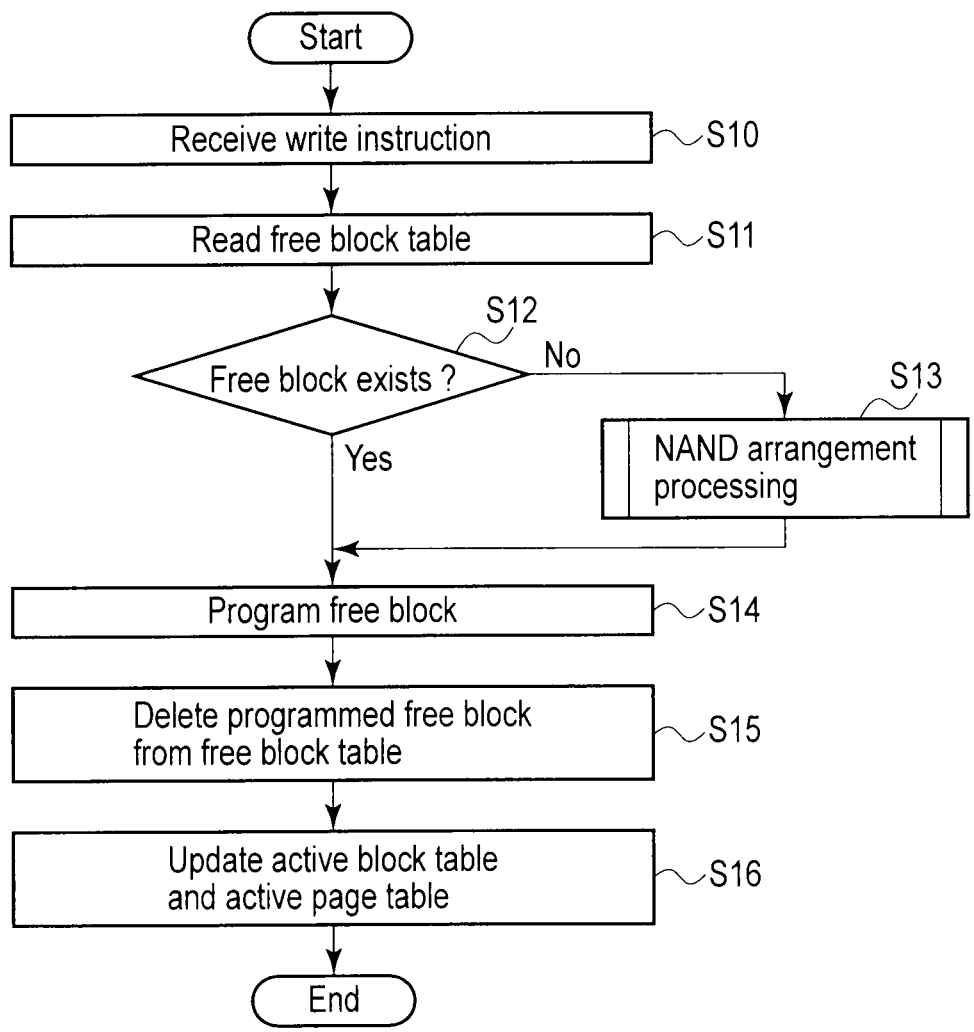
FIG. 7 is a flowchart illustrating the write operation of an SSD.

FIG. 7 is a flowchart illustrating the write operation of the SSD 3. The SSD 3 receives a write instruction from the host apparatus 2 (step S10). The write instruction includes a write command, a logical address, and data.

The SSD controller 11 reads the free block table from the DRAM 12 and acquires a physical block ID from the free block table (step S11). If no free block exists, the SSD controller 11 executes NAND arrangement processing, to be described later, to acquire a physical block ID (steps S12 and S13).

The SSD controller 11 performs program processing for a free block corresponding to the acquired physical block ID (step S14). The SSD controller 11 then deletes the programmed physical block ID from the free block table (step S15). After that, the SSD controller 11 updates the active block table and the active page table (step S16). That is, the SSD controller adds a logical address and a physical block ID corresponding to the programmed block to the active block table, and also adds the logical address, the physical block ID, and a physical page address to the active page table.

Note that erase may be done for the write target physical block before the program processing in step S14.

<2-2. NAND Arrangement Processing>

Figure 8:
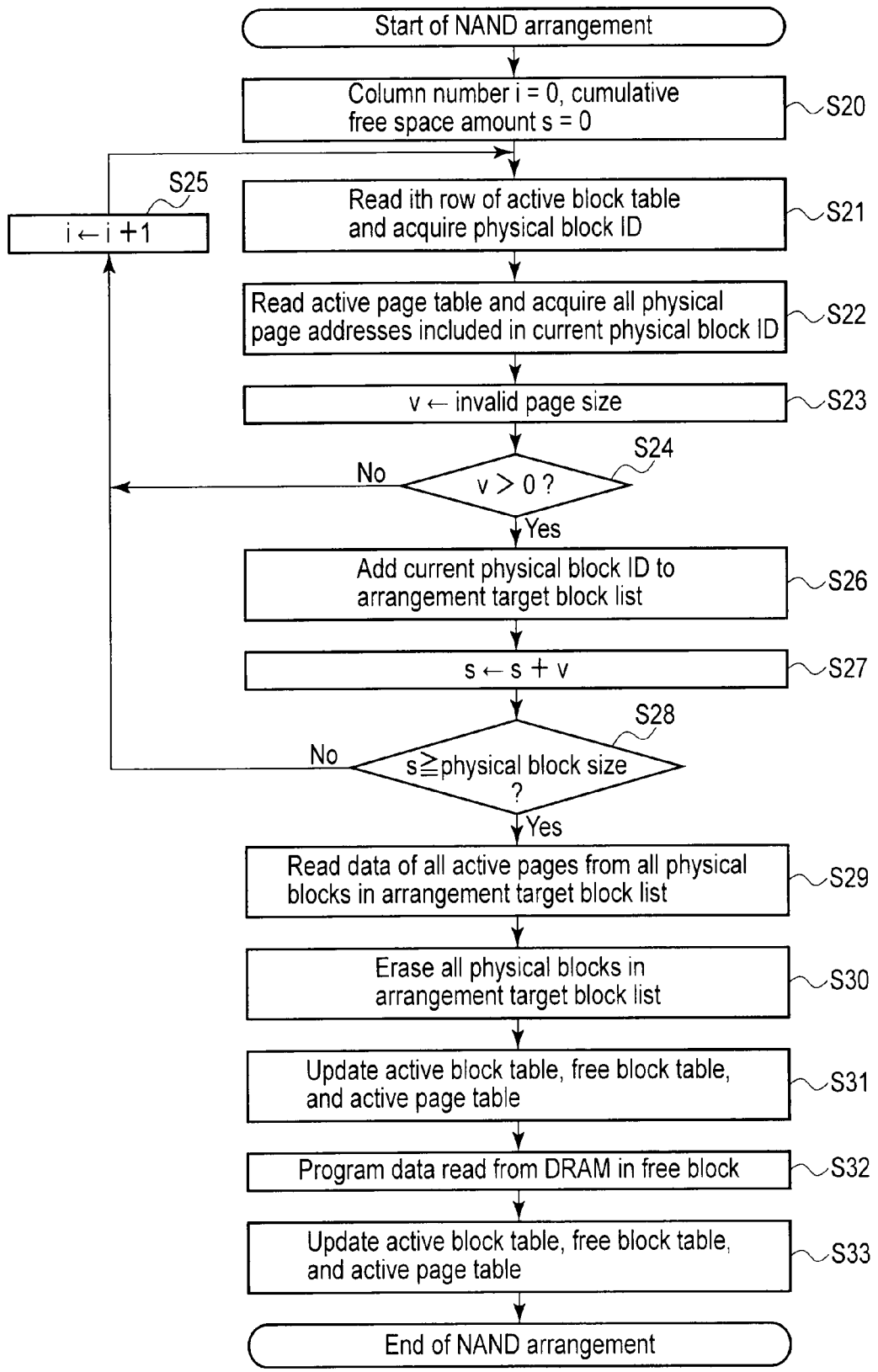
FIG. 8 is a flowchart illustrating NAND arrangement processing of the SSD.

The NAND arrangement processing of the SSD 3 will be described next. FIG. 8 is a flowchart illustrating the NAND arrangement processing of the SSD 3. Out of all pages included in a given physical block, active pages (valid pages) included in the active page table are associated with logical addresses. On the other hand, not all pages included in the given physical block are valid pages. Pages (invalid pages) that are not valid pages are not associated with logical addresses. That is, a physical block has a free data area equal to the size of invalid pages. The invalid pages and the valid pages are arranged to allocate a free block.

The SSD controller 11 sets a column number i=0 and a cumulative free space amount s=0 (step S20). The SSD controller 11 reads the first row of the active block table from the DRAM 12, and acquires a physical block ID (step S21). The physical block ID acquired in step S21 will be referred to as a current physical block ID. The SSD controller 11 reads the active page table from the DRAM 12, and acquires all physical page addresses included in the current physical block ID (step S22).

The SSD controller 11 calculates the size of invalid pages in the current physical block, and substitutes the invalid page size into a variable v (step S23). The SSD controller 11 determines whether "v>0" (step S24). If "v>0", the current physical block ID is added to the arrangement target block list (step S26). Upon determining in step S24 that no invalid page exists, the SSD controller 11 increments the current physical block ID to shift the operation target to the next physical block ID (step S25).

The SSD controller 11 adds the variable v to the cumulative free space amount s (step S27). The SSD controller 11 determines whether the cumulative free space amount s has reached the physical block size, that is, whether the total size of invalid pages acquired so far has reached the physical block size (step S28). If the cumulative free space amount s has not reached the physical block size, the column number i is incremented by one (step S25), and processing from step S21 is repeated.

On the other hand, if the cumulative free space amount s has reached the physical block size, the SSD controller 11 reads data of all active pages from all physical blocks in the arrangement target block list, and stores the read data in the DRAM 12 (step S29). The SSD controller 11 then performs erase processing for all physical blocks in the arrangement target block list (step S30). The SSD controller 11 updates the active block table, the free block table, and the active page table (step S31). That is, the SSD controller deletes the physical blocks that have undergone the erase processing from the active block table, and adds them to the free block table. In addition, the SSD controller deletes the active pages whose data have been read from the active page table.

The SSD controller 11 programs the data of all active pages stored in the DRAM 12 to the free block (step S32). The SSD controller 11 updates the active block table, the free block table, and the active page table (step S33). That is, the SSD controller deletes the programmed physical block from the free block table, and adds it to the active block table. In addition, the SSD controller adds the programmed physical pages to the active page table.

As described above, the NAND arrangement entails a lot of read, erase, and program operations of the NAND flash memory 13, and therefore takes a long time. If write is performed in the case of exhaustion of free blocks, a NAND arrangement occurs. Hence, the write processing speed viewed from the host apparatus 2 decreases, and the reliability of the NAND flash memory 13 may lower.

Note that the erase processing of step S30 may be performed not during a NAND arrangement of step S13 but immediately before the write operation of step S14.

<2-3. Delete Notification Processing>

Delete notification processing of the SSD 3 will be described next. There is a data set management command (generally called a trim command) described in INCITS ATA/ATAPI Command Set-2 (ACS-2). The trim command functions as a delete notification. When data is deleted on the host apparatus (host-invalid data), the delete notification processing is performed to notify the SSD of the logical address space where the deleted data exists so as to allow to handle that area as a free area even on the SSD. Upon receiving the delete notification, the SSD accesses the management table to invalidate that area. In the invalidation processing, the management table in the SSD is rewritten to make the region invalid so that the data becomes device-invalid data. The data itself in that region may actually be deleted or not.

Figure 9:
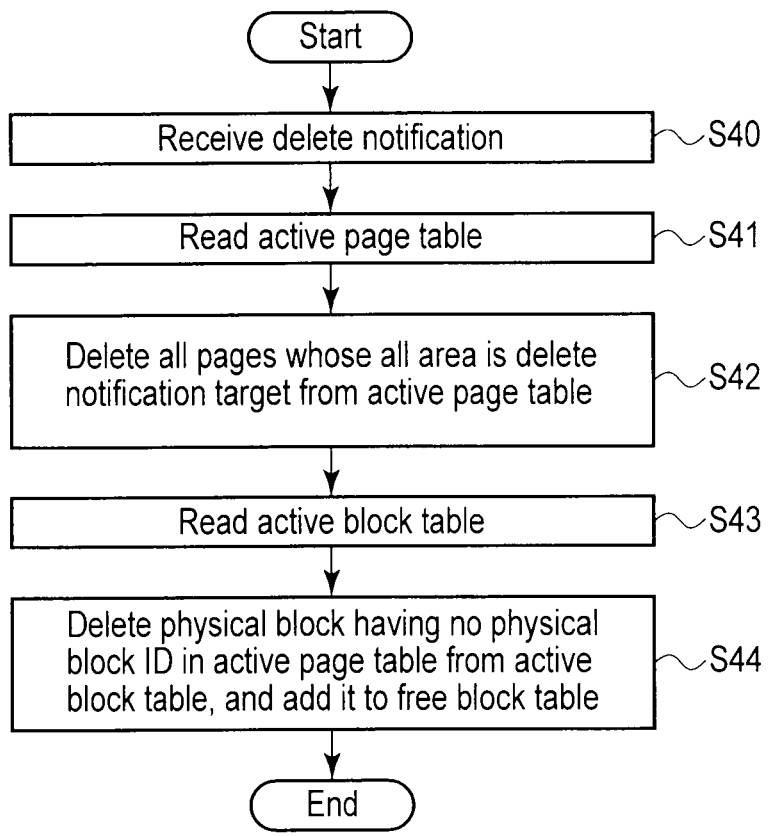
FIG. 9 is a flowchart illustrating delete notification processing of the SSD.

FIG. 9 is a flowchart illustrating the delete notification processing of the SSD 3. The SSD 3 receives a delete notification from the host apparatus 2 (step S40). The delete notification includes a delete command and a logical address.

The SSD controller 11 reads the active page table from the DRAM 12 (step S41). Out of all pages corresponding to the logical address area designated by the delete notification as the delete target, the SSD controller 11 deletes all pages whose all area is the delete notification target from the active page table (step S42).

The SSD controller 11 reads the active block table from the DRAM 12 (step S43). Referring to the active block table, the SSD controller 11 deletes a physical block having no physical block ID in the active page table from the active block table, and adds it to the free block table (step S44). Thus the device-valid data of logical address area which has been corresponding to the deleted pages becomes device-invalid data. The SSD 3 can thus allocate a free block not only by a NAND arrangement but also by the delete notification processing.

Note that the data size to be subjected to the delete notification of the host apparatus 2 need only be the minimum data size the SSD 3 manages on the management table or more.

<2-4. Read Operation>

Figure 10:
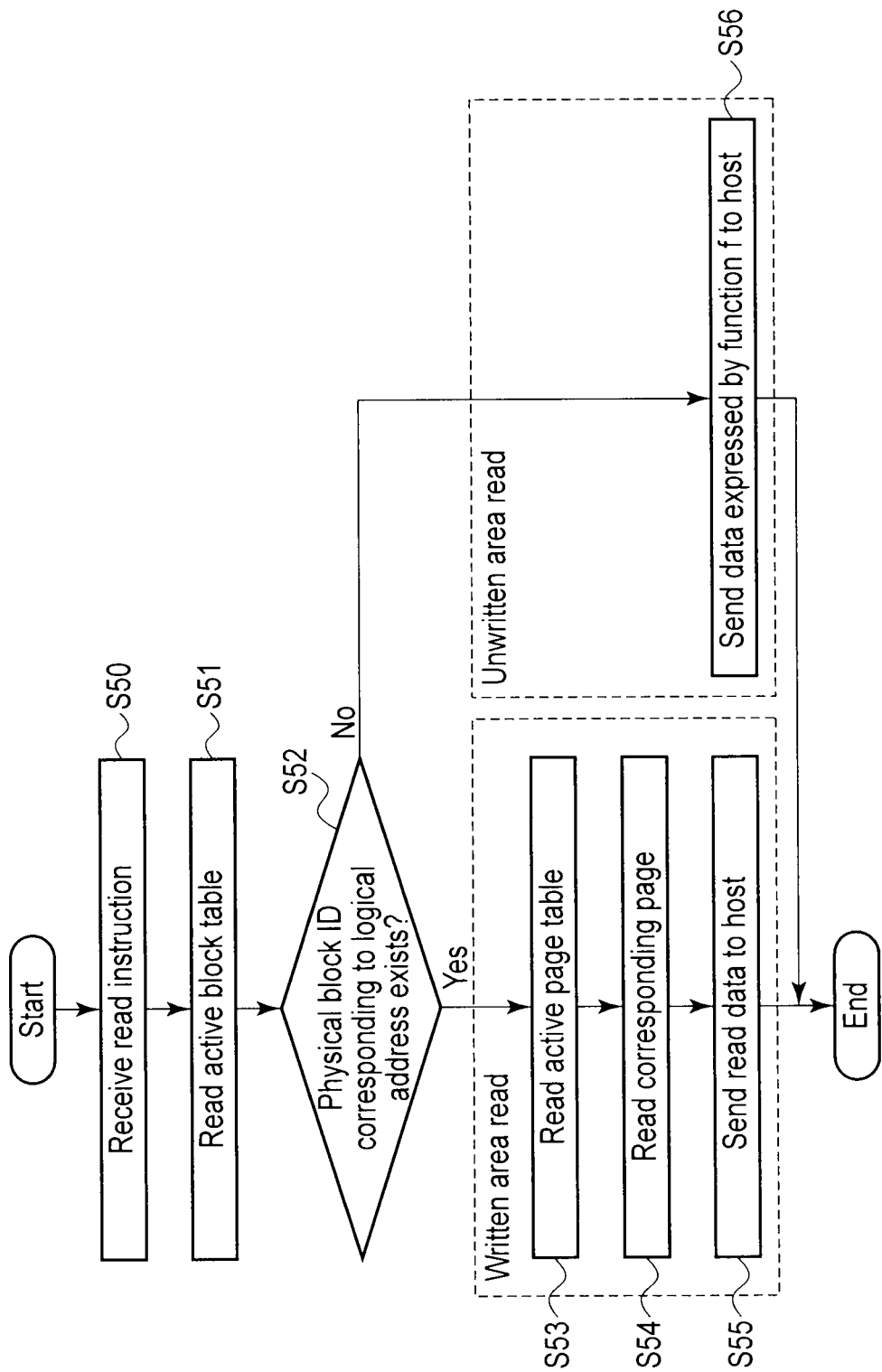
FIG. 10 is a flowchart illustrating the read operation of the SSD.

The read operation of the SSD 3 will be described next. FIG. 10 is a flowchart illustrating the read operation of the SSD 3. The SSD 3 receives a read instruction from the host apparatus 2 (step S50). The read instruction includes a read command and a logical address.

The SSD controller 11 reads the active block table from the DRAM 12 (step S51). The SSD controller 11 refers to a physical block ID corresponding to the logical address received from the host apparatus 2 (step S52). If the physical block ID exists in the active block table, the SSD controller 11 executes written area read processing from then on (device-valid data read operation). That is, the SSD controller 11 reads the active page table (step S53), and reads a corresponding page from the NAND flash memory 13 (step S54). The SSD controller 11 sends the read data to the host apparatus 2 (step S55).

On the other hand, if the physical block ID corresponding to the logical address received from the host apparatus 2 does not exist in the active block table, the SSD controller 11 executes unwritten area read processing from then on (device-invalid data read operation). That is, without executing the read processing of the NAND flash memory 13, the SSD controller 11 sends data expressed by the function f to the host apparatus 2 in a data length corresponding to the request from the host apparatus 2 (step S56). More specifically, let Ai be an address, and Di be data. The data expressed by the function f satisfies function $f(A_i)=D_i$ (i is an integer of 0 or more). The function f can freely be set on the user side. In this embodiment, setting the logical address (LBA: Logical Block Addressing) as a variable, "function $f(LBA)=0$" is defined. In this example, the SSD controller 11 sends, to the host apparatus 2, data filled with "0" in a data length corresponding to the request from the host apparatus 2.

The unwritten area read operation does not entail the read processing of the NAND flash memory 13. For this reason, the unwritten area read operation is performed faster than the written area read operation entailing the read processing of the active page table and the read processing of the NAND flash memory 13.

<2-5. Optimization Processing>

Optimization processing of the host apparatus 2 will be described next. FIG. 11 is a flowchart illustrating the optimization processing of the host apparatus 2. The logical address space is divided by the physical page size, and each divided element is defined as a logical page.

The CPU 20 of the host apparatus 2 monitors a specific flag (to be referred to as an optimization flag) (step S60). Upon confirming that the optimization flag is ON, the CPU sets the current logical address to 0 (step S61). The CPU 20 sends a read instruction to the SSD 3 to read data in the page size from the current logical address, that is, data of one logical page from the current logical address (step S62). The SSD 3 performs read processing in accordance with the read instruction received from the host apparatus 2, and sends the read data to the host apparatus 2.

The CPU 20 receives the read data of one logical page from the SSD 3 (step S63). The CPU 20 determines whether the read data is wholly filled with "0" (step S64). If the read data is wholly filled with "0", the CPU 20 sends a delete notification for the read-accessed logical address area (step S65). Accordingly, the SSD 3 performs the above-described delete notification processing.

The CPU 20 adds the page size to the current logical address (step S66). The CPU 20 repeats the processing of steps S62 to S66 until all logical pages are read (step S67).

The logical pages that have undergone the delete notification processing by the optimization processing are not associated with physical addresses in the SSD 3 because corresponding logical addresses are deleted from the active page table. When the read instruction is sent to the SSD 3 concerning the logical pages that have undergone the delete notification processing (device-invalid data read operation), the unwritten area read operation shown in FIG. 10 is performed, and the host apparatus 2 receives data filled with "0" from the SSD 3. Hence, the data in the SSD 3 viewed from the host apparatus 2 is the same as that before the optimization processing. On the other hand, since the unwritten area read operation (device-invalid data read operation) is performed faster than the written area read operation, the read performance of the logical pages of the delete notification target is higher than that before the optimization processing.

Note that the host apparatus 2 may perform the optimization processing when it has confirmed that the optimization flag is ON, and the SSD 3 is idle. This allows to prevent the performance of the SSD 3 in the normal operation (for example, write operation) from degrading.

The optimization processing can be done either for all LBA areas or only some of the LBA areas. For example, the optimization processing range may be limited to 10 Gbytes. In this case, for example, the first optimization processing may be executed for a range of 10 Gbytes from LBA=0. Next time the optimization flag is set, and the optimization processing starts, the processing may be executed for a range of 10 Gbytes from the LBA next to the end of the previously optimized area (for example, LBA=0+10 Gbytes+1). If the optimization processing is performed a plurality of number of times divisionally for all LBA areas in the above-described way, the time per optimization processing can shorten.

The optimization processing can be done for both the host-valid data and host-invalid data, or can be done only for the host-valid data.

<2-6. Optimization Flag Setting Processing>

Figure 12:
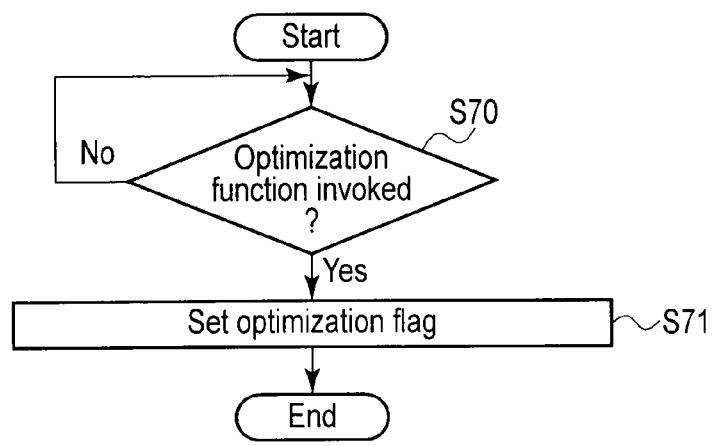
FIG. 12 is a flowchart illustrating optimization flag setting processing of the host apparatus.

Optimization flag setting processing of the host apparatus 2 will be described next. FIG. 12 is a flowchart illustrating the optimization flag setting processing of the host apparatus 2.

Figure 13:
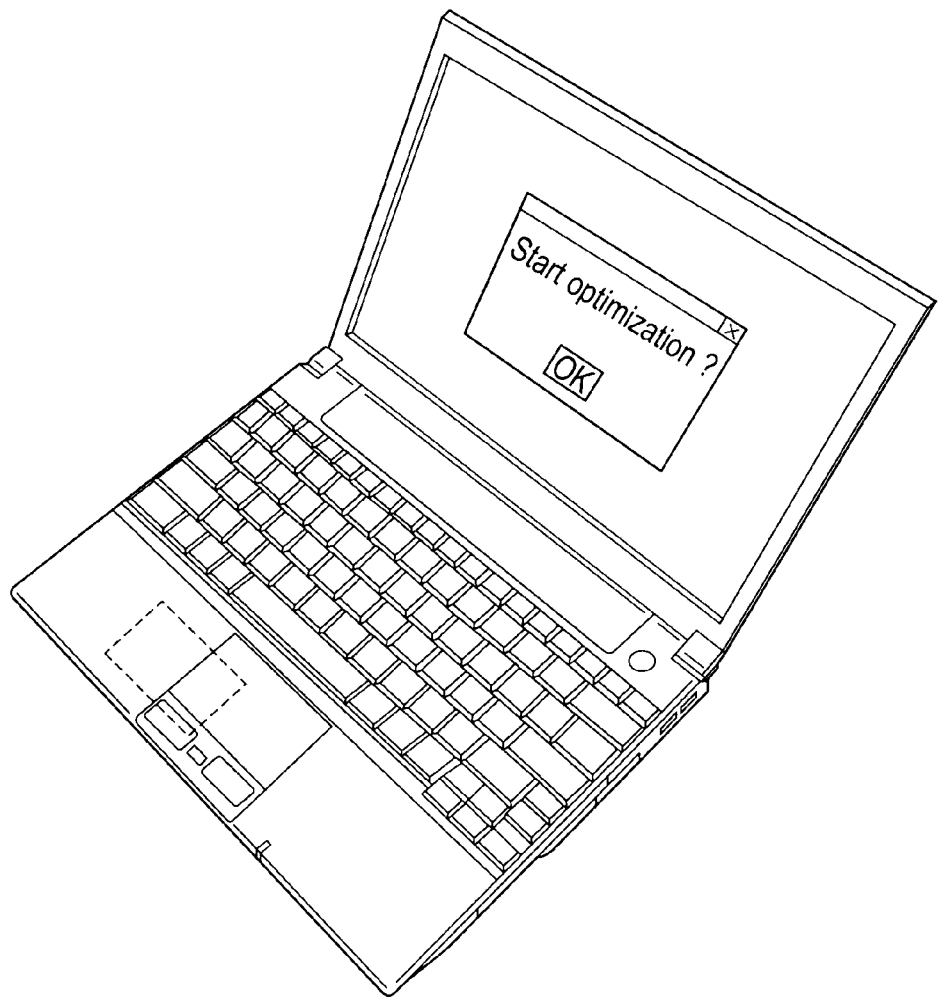
FIG. 13 is a schematic view showing an example of the GUI of an optimization program.

The user activates the optimization program in the host apparatus 2, and selects a button or a menu on the GUI (Graphical User Interface) to invoke the optimization function. Alternatively, the user activates the optimization program from a command line, and inputs a command to invoke the optimization function. FIG. 13 is a schematic view showing an example of the GUI of the optimization program. On the GUI shown in FIG. 13, the user selects the OK button using a mouse or the like. By this user operation, the optimization function of the host apparatus 2 is invoked.

The CPU 20 of the host apparatus 2 monitors whether the user has invoked the optimization function (step S70). When the user has invoked the optimization function, the CPU 20 sets the optimization flag in the storage area 23C of the DRAM 23. Upon confirming that the optimization flag is on, the CPU performs the above-described optimization processing from then on.

[3. Effects]

According to the first embodiment described above in detail, the following effects can be obtained.

The host apparatus 2 sends a delete notification to the SSD 3 concerning the logical address area where a specific pattern is repeated out of valid user data on the host apparatus 2 (host-valid data), thereby deleting the logical address area. The user data that has undergone the delete notification processing is read from a specific area (for example, DRAM) other than the NAND flash memory 13, thereby speeding up the user data read operation.

A free block can be allocated by sending a delete notification to the SSD 3. For this reason, after the optimization processing, the performance of the write operation is improved, and degradation of the reliability of the SSD 3 can be prevented. The more the data filled with "0" is in the host-valid and device-valid user data on the host apparatus 2, the more the effect is enhanced.

FIG. 14 is a graph showing the relationship between the average read rate and the ratio of data filled with "0". The average read rate is the average of the read rates of read operations that occurred during a specific period. The higher the ratio of data filled with "0" to the user data stored in the SSD 3 is, the more the unwritten area read operation is performed. Hence, the average read rate rises.

FIG. 15 is a graph showing the relationship between the free block amount and the ratio of data filled with "0". The raised portion of the graph of FIG. 15 indicates the free block amount outside the user area. The higher the ratio of data filled with "0" to the user data stored in the SSD 3 is, the more the free block amount viewed from the host apparatus 2 is.

For example, when the SSD 3 is fully formatted in Windows®, "0" data is written to all logical addresses of the SSD 3. Since the number of free blocks largely decreases, the write performance lowers, and the reliability of the SSD 3 readily degrades in the subsequent write operation. However, when the optimization processing of this embodiment is executed for the SSD 3 after full formatting, the delete notification processing is performed for all areas filled with "0". For this reason, the number of free blocks greatly increases. This allows to increase the write performance and reduce degradation of the reliability of the SSD 3 in the subsequent write operation.

This embodiment can be implemented by installing, in the host apparatus 2, software or firmware that performs the optimization processing for the SSD 3 to rewrite the management table when the SSD 3 is idle. It is therefore possible to easily implement the function for implementing this embodiment. The optimization processing is preferably performed when the SSD 3 is idle. Thus implementing this embodiment does not entail degradation of the write performance of the SSD 3, either.

Note that in the above description, data filled with "0" is used as the data sent by the SSD controller 11 to the host apparatus 2 in the unwritten area read operation (device-invalid data read operation). However, the data expressed by the function f can freely be set on the user side. For example, data filled with "1" may be used by defining "function f(LBA)=1". Alternatively, data expressed by "LBA" may be used by defining "function f(LBA)=LBA". The logical address space may be divisionally be managed so that data filled with "0" is used for the delete notification in the first partition, and data filled with "1" is used for the delete notification in the second partition. In this case, the function f is defined as, for example, "f(LBA)=0(LBA<Cap/2), f(LBA)=1 (LBA≥Cap/2)". Cap is the storage capacity of the SSD 3.

The host apparatus 2 may send the delete notification when the data of a logical page read from the SSD 3 by the optimization processing is the same as a specific data pattern X (the data size of the data pattern X equals the page size). In this case, "function f=X". When the SSD 3 receives the delete notification, the SSD controller 11 sends the data pattern X stored in the DRAM 12 by the unwritten area read operation (device-invalid data read operation) to the host apparatus 2. The example in which a predetermined data pattern is used for the delete notification is especially effective when the memory system 1 frequently handles the same data.

In this embodiment, for the sake of simplicity, the physical addresses of the NAND flash memory are directly associated with the LBAs in the management information. However, as in, for example, U.S. Patent Application Publication No. 2009-0222617, the LBAs may be managed using a management unit that is a natural number (2 or more) multiple of the sector size, and not the LBAs but the correspondence relationship between the management unit and the NAND flash memory may be described in the management information. Like the management unit of LBA, the management information that describes the correspondence relationship between the LBAs and the physical addresses of the NAND flash memory can take various forms. However, details of the form of the table (logical/physical conversion table) that describes the correspondence relationship between the physical addresses and the LBAs do not affect the gist of the embodiment.

In this embodiment, when data received from the host apparatus is written to the NAND flash memory, the data itself (plain text) received from the host apparatus is recorded. However, this embodiment is also applicable even when the plain text is randomized and stored in the NAND flash memory, or encrypted and stored in the NAND flash memory.

[Second Embodiment]

In the optimization processing of the first embodiment, all logical addresses are read. In the second embodiment, however, a file list is acquired by accessing the management area of the OS in a host apparatus 2, and optimization processing is executed for each file.

Figure 16:
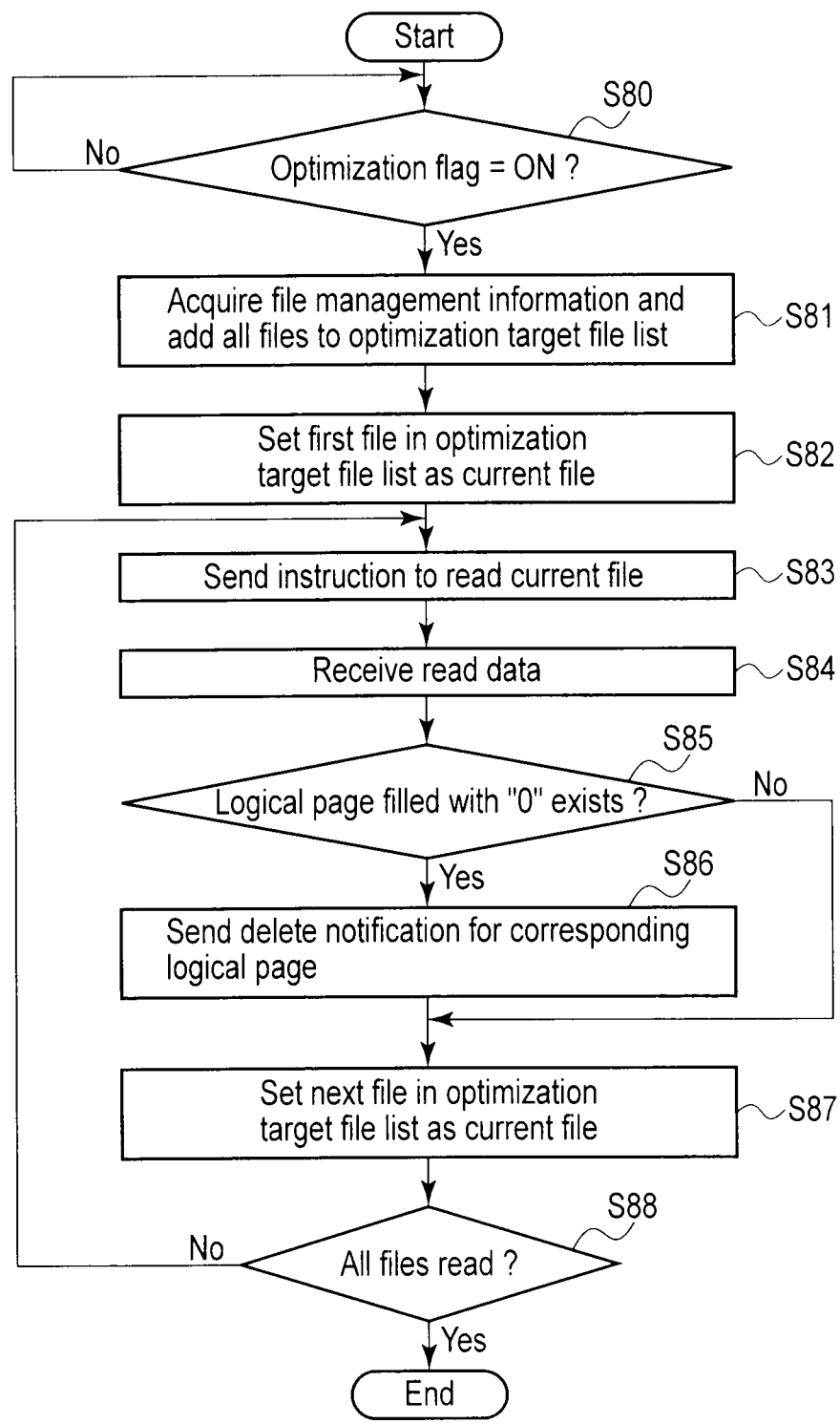
FIG. 16 is a flowchart illustrating optimization processing of a host apparatus according to the second embodiment.

FIG. 16 is a flowchart illustrating the optimization processing of the host apparatus 2 according to the second embodiment. A CPU 20 of the host apparatus 2 monitors the optimization flag (step S80). Upon confirming that the optimization flag is ON, the CPU acquires file management information from the OS, and adds all files registered in the file management information to the optimization target file list (step S81). The optimization target file list is stored in, for example, a DRAM 23 of the host apparatus 2.

The CPU 20 sets the first file in the optimization target file list as the current file (step S82). The CPU 20 sends a read instruction to an SSD 3 to read the current file (step S83). The SSD 3 executes read processing in accordance with the read instruction received from the host apparatus 2, and sends the read data to the host apparatus 2.

The CPU 20 receives the read data corresponding to the current file from the SSD 3 (step S84). The CPU 20 determines whether a logical page filled with "0" exists in the read file (step S85). If a logical page filled with "0" exists, the CPU 20 sends a delete notification for the logical page of interest (step S86). Accordingly, the SSD 3 performs the above-described delete notification processing.

The CPU 20 sets the next file in the optimization target file list as the current file (step S87). The CPU 20 repeats the processing of steps S83 to S87 until all files in the optimization target file list are read (step S88).

As described above in detail, according to the second embodiment, the read operation is performed not for the whole logical address space (not for both the host-valid data and host-invalid data) but only for valid files on the host apparatus 2 (only for host-valid data) in the optimization processing. Since the data amount of the optimization target can be reduced, the time required for the optimization processing can shorten.

This optimization processing can be performed either for all files or for only several files. For example, the number of files to be optimized may be limited to 10,000. In this case, for example, the first optimization processing is performed for 10,000 files from the top of the file list. Next time the optimization flag is set, and the optimization processing starts, the processing may be executed for 10,000 from the file (for example, the "0+10000+1"th file in the file list) next to the last file that has previously undergone the optimization processing. Alternatively, the capacity of the files to be optimized may be limited to 10 Gbytes. In this case, for example, the first optimization processing is performed for files of 10 Gbytes in total from the top of the file list. Next time the optimization flag is set, and the optimization processing starts, the processing may be executed for files of 10 Gbytes in total from the file next to the last file that has previously undergone the optimization processing. If the optimization processing is performed a plurality of number of times divisionally for all files in the above-described way, the time per optimization processing can shorten.

[Third Embodiment]

The third embodiment is another embodiment regarding optimization flag setting processing. When the timer in a host apparatus 2 has reached a predetermined time, the optimization flag is set.

FIG. 17 is a flowchart illustrating the optimization flag setting processing of the host apparatus 2 according to the third embodiment. The host apparatus 2 incorporates a timer. A CPU 20 of the host apparatus 2 monitors whether the timer has reached a predetermined time (step S90). When the timer has reached the predetermined time, the CPU 20 sets the optimization flag in a storage area 23C of a DRAM 23. From then on, upon confirming that the optimization flag is ON, the above-described optimization processing is performed.

In the third embodiment, a memory system 1 can perform the optimization processing in the background without an explicit instruction from the user.

[Fourth Embodiment]

The fourth embodiment is still another embodiment regarding optimization flag setting processing. Information sent from an SSD 3 to a host apparatus 2 triggers the optimization flag setting processing. The information to be sent from the SSD 3 to the host apparatus 2 to stimulate execution of optimization processing will be referred to as optimization activation information. An example of information managed in the SSD 3 is the free block count. In the fourth embodiment, optimization activation information is generated using the free block count.

The operation on the side of the SSD 3 will be explained first. FIG. 18 is a flowchart illustrating optimization activation information generation processing of the SSD 3 according to the fourth embodiment. An SSD controller 11 monitors the free block count (step S100). When the free block count has fallen below a predetermined value (for example, a predetermined value preset at the time of design), the SSD controller 11 sends the optimization activation information to the host apparatus 2 (step S101). As the predetermined value, for example, the minimum number of free blocks necessary for maintaining a predetermined write speed or more in the write operation of the SSD 3 can be used.

The operation on the side of the host apparatus 2 will be described next. FIG. 19 is a flowchart illustrating the optimization flag setting processing of the host apparatus 2. A CPU 20 of the host apparatus 2 monitors whether the optimization activation information has been received from the SSD 3 (step S110). Upon receiving the optimization activation information, the CPU 20 sets the optimization flag in a storage area 23C of a DRAM 23. From then on, upon confirming that the optimization flag is ON, the above-described optimization processing is performed.

Monitoring and sending/receiving the optimization activation information may be done using, for example, SMART READ DATA (B0h (D0h)) that is a command of a memory self-diagnostic function S.M.A.R.T (Self-Monitoring Analysis and Reporting Technology) described in INCITS ACS-2, or a command unique to the vendor. Alternatively, the CPU 20 may directly monitor the free block count of the SSD 3 using, for example, SMART READ DATA (B0h (D0h)) that is a command of S.M.A.R.T or a command unique to the vendor. When the free block count has fallen below a predetermined value (for example, a predetermined value preset at the time of design and held on an optimization program 23B), the CPU 20 may set the optimization flag in the storage area 23C of the DRAM 23.

In the fourth embodiment, it is possible to perform the optimization processing at an optimum timing on the side of the SSD 3.

[Fifth Embodiment]

Figure 20:
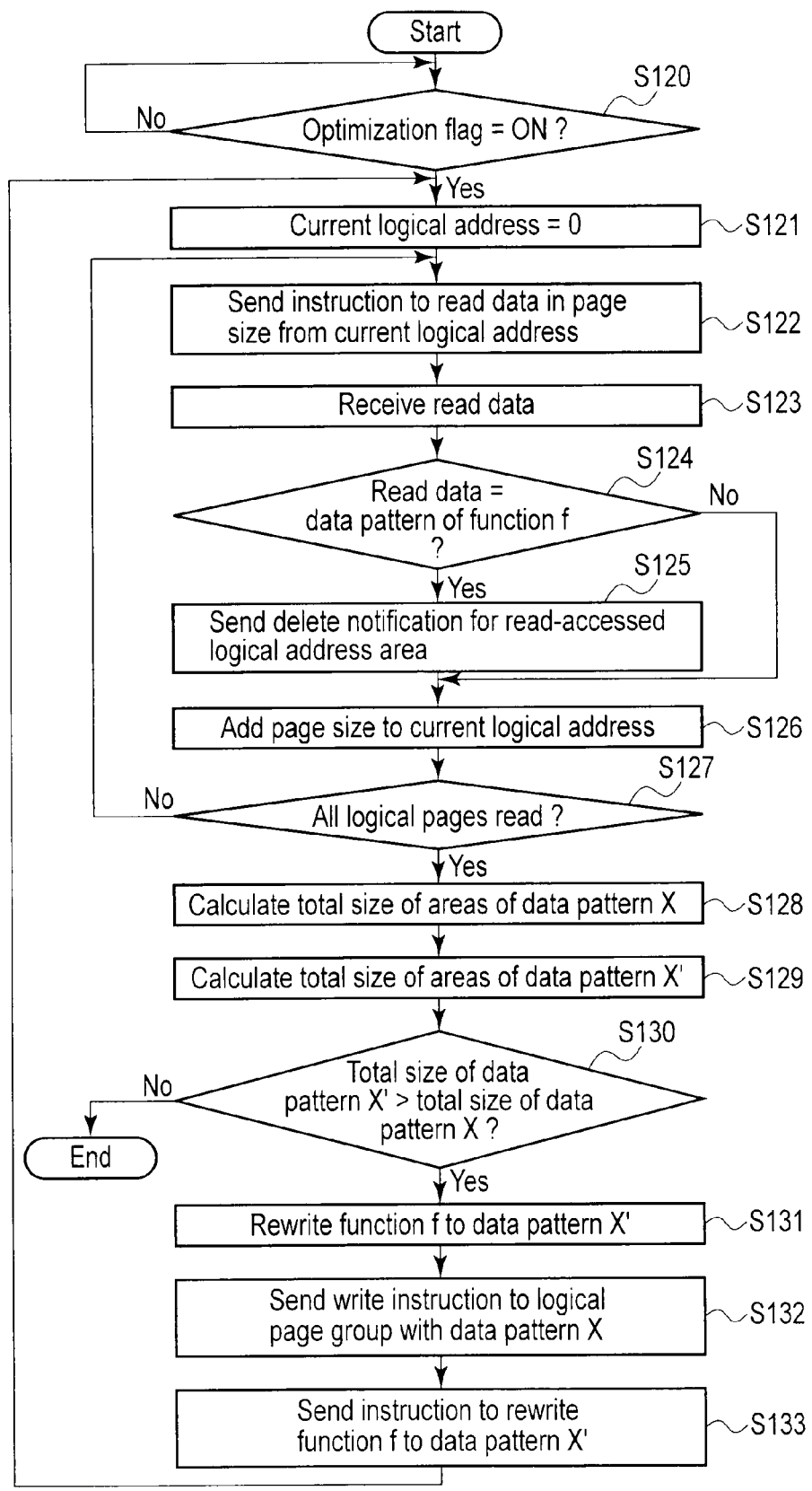
FIG. 20 is a flowchart illustrating optimization processing of a host apparatus according to the fifth embodiment.

In the fifth embodiment, a memory system 1 is configured to be able to change a data pattern defined by a function f in accordance with the use state of an SSD 3. FIG. 20 is a flowchart illustrating optimization processing of a host apparatus 2 according to the fifth embodiment. A specific data pattern is represented by X. Assume that "function f=X".

Steps S120 to S123 of FIG. 20 are the same as steps S60 to S63 of FIG. 11. A CPU 20 determines whether the read data has the same pattern as the data pattern expressed by the function f (step S124). If the read data has the same pattern as the data pattern expressed by the function f, the CPU 20 sends a delete notification for the read-accessed logical address area (step S125). Accordingly, the SSD 3 performs the above-described delete notification processing.

The CPU 20 adds the page size to the current logical address (step S126). The CPU 20 repeats the processing of steps S122 to 5126 until all logical pages are read (step S127).

The CPU 20 calculates the total size of the areas of the data pattern X out of all logical address areas (step S128). The CPU 20 calculates the total size of the areas of data pattern X' different from the data pattern X out of all logical address areas (step S129).

The CPU 20 determines whether the total size of the data pattern X' is larger than that of the data pattern X (step S130). If the total size of the data pattern X' is equal to or smaller than that of the data pattern X, the CPU 20 ends the optimization processing. On the other hand, if the total size of the data pattern X' is larger than that of the data pattern X, the CPU 20 rewrites "function f=X" stored in a storage area 23D of a DRAM 23 to "function f=X'" (step S131). If the determination condition in step S130 is set as (total size of data pattern X')≥(total size of data pattern X), rewrite of the function f frequently occurs when the total size of the data pattern X' almost equals the total size of the data pattern X. Hence, a margin is preferably added to set the determination condition as, for example, (total size of data pattern X')≥1.1 ×(total size of data pattern X).

At the current point of time, since the delete notification processing has been performed for the logical pages with the data pattern X, the SSD 3 is not managing the logical pages as active pages. For this reason, the CPU 20 sends a write instruction to the SSD 3 to rewrite the logical pages with the data pattern X to the data pattern X (step S132). The CPU 20 sends an instruction to the SSD 3 to rewrite "function f=X" stored in a storage area 13C of a NAND flash memory 13 to "function f=X'" (step S133). The instruction to rewrite the function f may be sent using, for example, a command unique to the vendor. Accordingly, the SSD 3 writes "function f=X'" to the storage area 13C of the NAND flash memory 13 and updates the function f in a DRAM 12.

As described above in detail, according to the fifth embodiment, the data pattern as the delete notification target can be changed. Since the unwritten area read operation is performed for the data pattern with the highest existence probability, the read operation can be speeded up. Note that the fifth embodiment is also applicable to the second embodiment in which the optimization processing is performed for each file.

[Sixth Embodiment]

Figure 21:
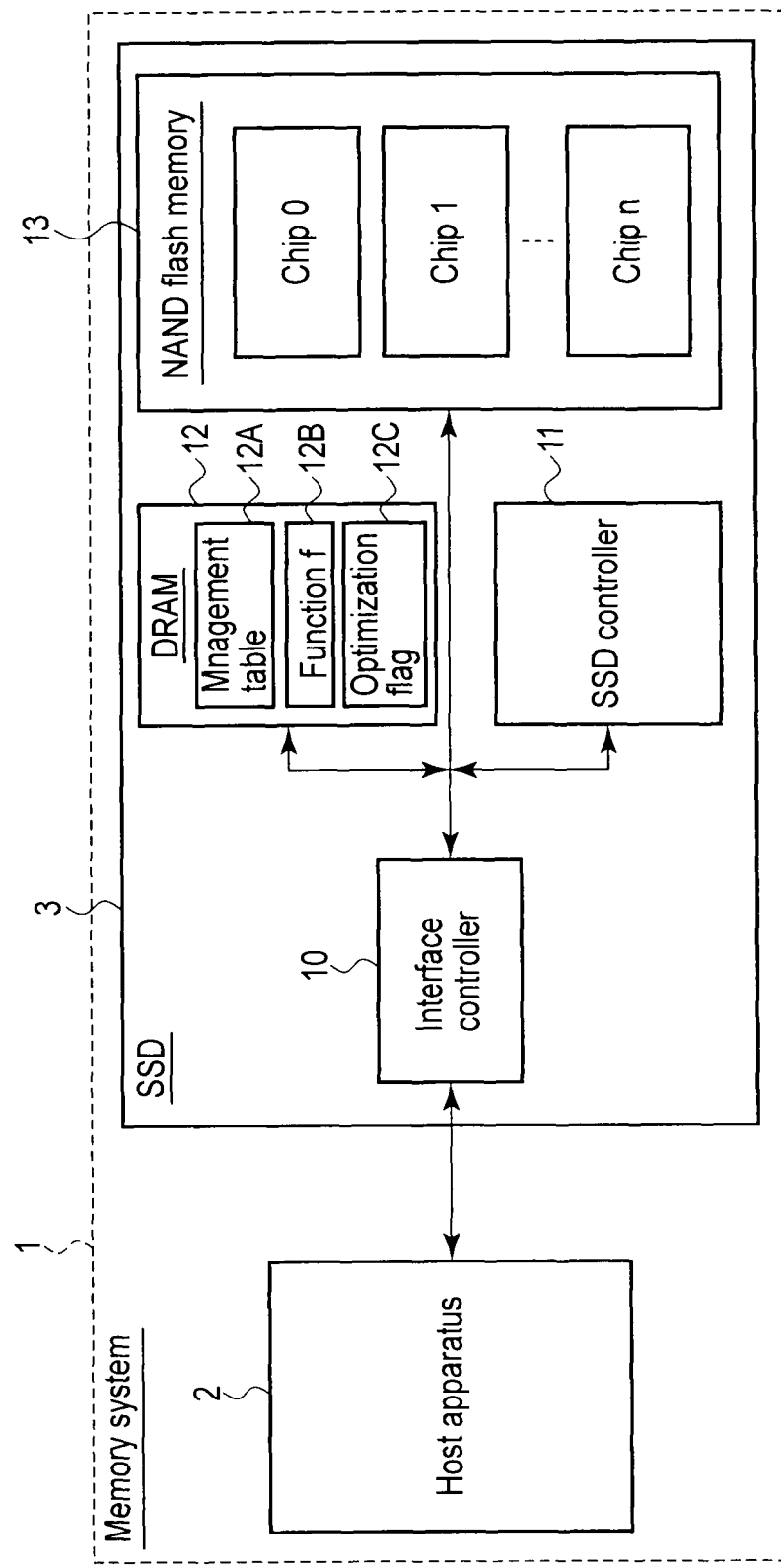
FIG. 21 is a block diagram of a memory system according to the sixth embodiment.

In the sixth embodiment, an SSD 3 itself performs the same processing as the above-described optimization processing. FIG. 21 is a block diagram of a memory system 1 according to the sixth embodiment. A DRAM 12 of the SSD 3 includes a storage area 12C that stores the optimization flag. The remaining components are the same as in FIG. 1.

In this embodiment, a host apparatus 2 need not always hold an optimization program 23B, an optimization flag 23C, and a function f (23D). An SSD controller 11 sets the optimization flag in the storage area 12C of the DRAM 12.

FIG. 22 is a view for explaining part of a management table stored in the DRAM 12. An optimized mark is preferably added to the active page table so as not to repeat optimization processing. The optimized mark is provided in correspondence with the logical address. The optimized mark serves as information to be used to determine whether optimization processing, to be described later, has been executed.

The write operation of the SSD 3 is the same as that of the flowchart of FIG. 7 described in the first embodiment except that optimized mark=false is added when updating the active page table in step S16 of FIG. 7.

Figure 23:
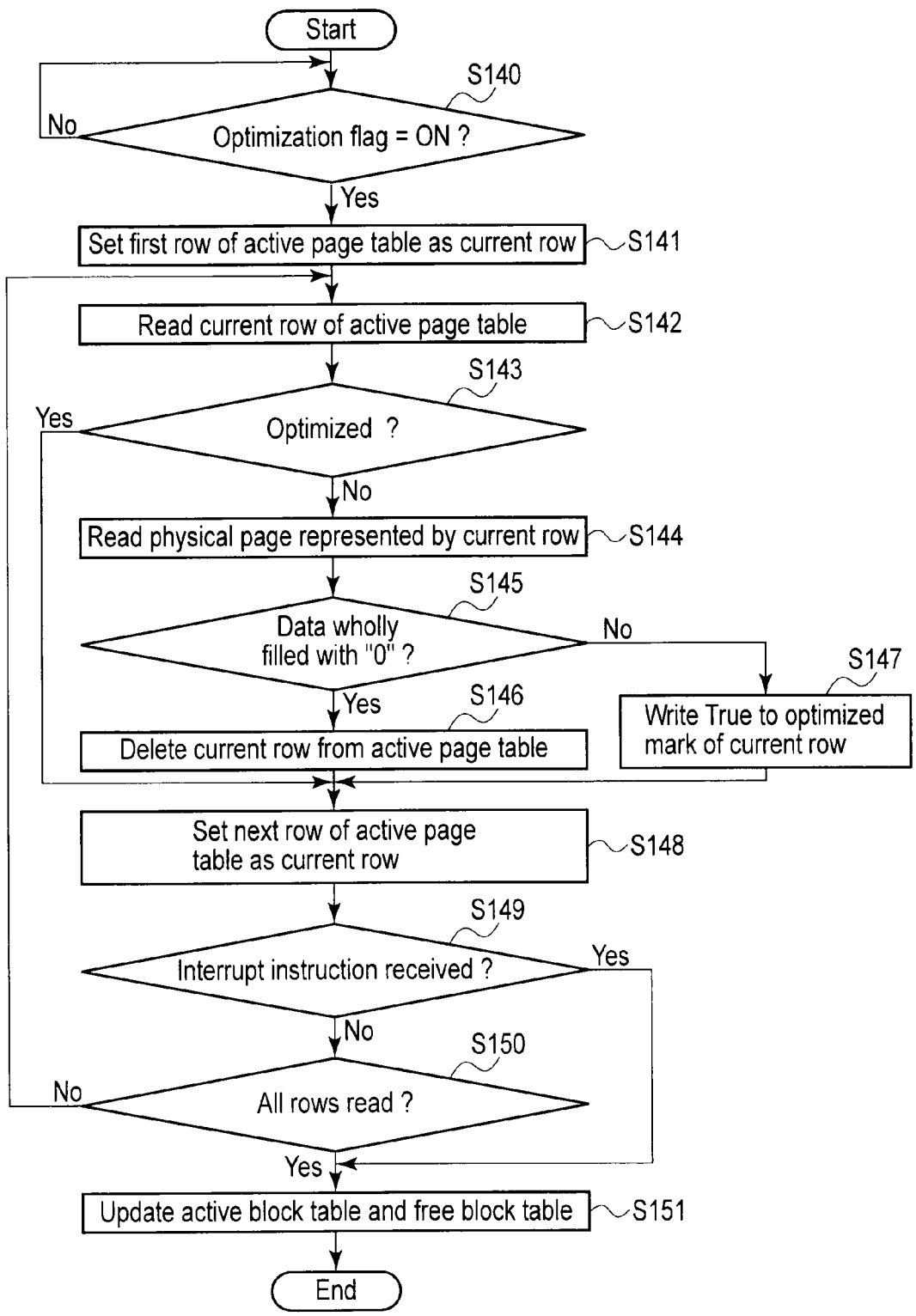
FIG. 23 is a flowchart illustrating optimization processing of an SSD.

The optimization processing will be described next. FIG. 23 is a flowchart illustrating the optimization processing of the SSD 3.

Upon confirming that the optimization flag is ON in the storage area 12C of the DRAM 12 (step S140), the SSD controller 11 sets the first row of the active page table as the current row (step S141). The SSD controller 11 reads the current row of the active page table from the DRAM 12 (step S142).

The SSD controller 11 checks the optimized mark included in the current row to determine whether the physical page represented by the current row has already been optimized (step S143). If the physical page has already been optimized (optimized mark=True), the optimization processing is not performed for the physical page. If the physical page has not been optimized (optimized mark=false), the SSD controller 11 reads the physical page represented by the current row from a NAND flash memory 13 (step S144).

The SSD controller 11 determines whether the read data is filled with "0" (when "function f(LBA)=0") (step S145). If the read data is filled with "0", the SSD controller 11 deletes the current row from the active page table (step S146). Alternatively, the SSD controller 11 may invalidate the current row by writing invalid data to the elements of the current row. If the read data is not filled with "0", the SSD controller 11 writes "True" to the optimized mark of the current row (step S147). The SSD controller 11 sets the next row of the active page table as the current row (step S148).

Upon receiving an interrupt instruction from the host apparatus 2, the SSD controller 11 advances to step S151 to end the optimization processing. If no interrupt instruction is received from the host apparatus 2, the SSD controller 11 repeats the processing of steps S142 to S148 until all rows of the active page table are read (step S150). The SSD controller 11 updates the active block table and the free block table (step S151). That is, referring to the active block table, the SSD controller 11 deletes physical blocks having no elements in the active page table from the active block table and adds them to the free block table. Note that if the interrupt instruction is urgent, the active block table and the free block table may be updated later.

The read operation and the NAND arrangement operation of the SSD 3 are the same as in the first embodiment. Hence, when the host apparatus 2 sends a read instruction to the SSD 3 concerning a logical page deleted by the optimization processing, the unwritten area read operation (device-invalid data read operation) in FIG. 10 is performed, and the host apparatus 2 receives data filled with "0" from the SSD 3 (when "function f(LBA)=0"). For this reason, the data in the SSD 3 viewed from the host apparatus 2 is the same as that before the optimization processing. On the other hand, since the unwritten area read operation (device-invalid data read operation) is performed faster than the written area read operation (device-valid data read operation), the read performance of the logical pages of the optimization target is higher than that before the optimization processing. In addition, according to the sixth embodiment, the processing load on the host apparatus 2 can be reduced.

Note that the condition to set the optimization flag may be an explicit instruction from the host apparatus 2 by, for example, a command unique to the vendor or not. For example, the SSD controller 11 may set the optimization flag in the storage area 12C of the DRAM 12 when no access is received from the host apparatus 2 for a predetermined period (for example, 10 sec). As in the fourth embodiment, the SSD controller 11 may monitor the free block count, and set the optimization flag in the storage area 12C of the DRAM 12 when the free block count has fallen below a predetermined value (for example, a predetermined value preset at the time of design).

The optimization may be performed either for all elements of the active page table or for only several elements. For example, each optimization operation may be performed for only 10,000 elements. In this case, the first optimization is performed for the 0th to 9999th elements of the active page table. The next optimization is performed for the 10000th to 19999th elements. The third optimization is performed for the 20000th to 29999th elements. If the optimization is performed divisionally for the active page table, the time per optimization can shorten.

Note that in the above description, data filled with "0" is used as the data sent by the SSD controller 11 to the host apparatus 2 in the unwritten area read operation (when "function f(LBA)=0"). However, the data expressed by the function f can freely be set on the user side. In step S145, the data pattern is compared with the function f. For example, data filled with "1" may be used by defining "function f(LBA)=1". Alternatively, data expressed by "LBA" may be used by defining "function f(LBA)=LBA". The logical address space may divisionally be managed so that data filled with "0" is used for the optimization in the first partition, and data filled with "1" is used for the optimization in the second partition. In this case, the function f is defined as, for example, "f(LBA)=0 (LBA<Cap/2), f(LBA)=1(LBA≥Cap/2)". Cap is the storage capacity of the SSD 3.

The SSD controller 11 may perform the optimization processing when the data read from a given LBA of the NAND flash memory 13 is the same as a specific data pattern X (the data size of the data pattern X equals the page size) in step S145 (step S146). In this case, "function f=X". When the SSD 3 receives the delete notification, the SSD controller 11 sends the data pattern X stored in the DRAM 12 by the unwritten area read operation to the host apparatus 2. The example in which a predetermined data pattern is used for the delete notification is especially effective when the memory system 1 frequently handles the same data.

In this embodiment, for the sake of simplicity, the physical addresses of the NAND flash memory are directly associated with the LBAs in the management information. However, as in, for example, U.S. Patent Application Publication No. 2009-0222617, the LBAs may be managed using a management unit that is a natural number (2 or more) multiple of the sector size, and not the LBAs but the correspondence relationship between the management unit and the NAND flash memory may be described in the management information. Like the management unit of LBA, the management information that describes the correspondence relationship between the LBAs and the physical addresses of the NAND flash memory can take various forms. However, details of the form of the table (logical/physical conversion table) that describes the correspondence relationship between the physical addresses and the LBAs do not affect the gist of the embodiment.

In this embodiment, when data received from the host apparatus is written to the NAND flash memory, the data itself (plain text) received from the host apparatus is recorded. However, this embodiment is also applicable even when the plain text is randomized and stored in the NAND flash memory, or encrypted and stored in the NAND flash memory. At this time, the data comparison in step S145 is preferably performed for the plain text after decryption. However, the data comparison may be done for the randomized data or encrypted data before decryption.

[Seventh Embodiment]

In the seventh embodiment, if data of a given logical address area the host apparatus has read from the SSD is the same as comparison source data, the host apparatus sends a delete notification for the logical address area. The management table is rewritten so that the logical address corresponding to the logical address area is associated with a "comparison source data area" to which a physical address on the NAND flash memory is assigned as a pseudo address, thereby speeding up the read operation of user data including a repetitive pattern and increasing the number of free blocks usable by the SSD.

[1. Arrangement of Memory System]

If data (comparison source data) stored in the comparison source data area repetitively exists in the physical address area of the NAND flash memory, all LBAs (logical addresses) corresponding to the physical address area are associated with the comparison source data area by this embodiment. Since physical blocks corresponding to "(data amount of repetitive data patterns)-(data amount of repetitive data areas)" become free blocks at maximum, the number of free blocks usable by the SSD controller can be increased. The comparison source data area is allocated on a RAM such as a DRAM or an LSI, a RAM, or a NAND flash memory in the SSD controller. Each case will be explained below. Note that in this embodiment, the minimum management unit of the NAND flash memory is assumed to equal the physical page size for the sake of simplicity (in general, the minimum management unit need only be a natural number multiple of the physical page size).

<When Comparison Source Data Area Exists on DRAM>

FIG. 24 is a block diagram of a memory system 1 in which the comparison source data area is allocated on a DRAM 12. Individual chips of a NAND flash memory 13 will be omitted in the block diagram hereinafter for the sake of simplicity.

The DRAM 12 includes a storage area 12D that stores comparison source data. The NAND flash memory 13 includes a storage area 13E that stores comparison source data for backup (to be referred to as backup comparison source data hereinafter). For example, initial data such as data filled with "0" is written to the storage area 13E of the NAND flash memory 13 at the time of shipment from the factory. The size of the storage area 12D of the DRAM 12 equals that of the storage area 13E of the NAND flash memory 13. Upon activating an SSD 3, an SSD controller 11 reads the backup comparison source data to the DRAM 12.

This embodiment features the physical address mapping method, as compared to the first embodiment. FIG. 25 is a view for explaining the physical address mapping table. In FIG. 25, "h" indicates the hexadecimal notation.

Each physical page of the NAND flash memory 13 is assigned a physical block ID and a physical page address so that all the physical pages are distinguishable from each other. In the first embodiment, only the physical pages of the NAND flash memory 13 are assigned as the physical addresses. In the seventh embodiment, however, the storage area 12D (comparison source data area) on the DRAM 12 is allocated as the physical addresses of the NAND flash memory. In this embodiment, the management unit of the comparison source data area equals the minimum management unit of the NAND flash memory 13, that is, the physical page size.

The pseudo physical block IDs in the comparison source data area can be distinguished from those in the NAND flash memory 13 by address mapping. The physical address area of the DRAM 12 to which the comparison source data area is allocated is managed divisionally for each physical page size of the NAND flash memory. A pseudo physical page address is assigned to each management unit in ascending order of the physical address of the DRAM 12. If the size of the comparison source data area is larger than the physical block size of the NAND flash memory 13, the physical address area of the DRAM 12 to which the comparison source data area is allocated is divided by the physical block size. A pseudo physical block ID is assigned to each divided unit in ascending order of the physical address of the DRAM 12. The physical page address repeats from 0 to the maximum physical page address. The physical block IDs assigned to the comparison source data area are registered in the active block table in advance at the time of shipment from the factory.

The size of the comparison source data area is a natural number multiple of the minimum management unit of the NAND flash memory 13, that is, a natural number multiple of the physical page size in this embodiment. The size of the comparison source data area can be either equal to or larger than that of the physical block of the NAND flash memory 13 or smaller. In this embodiment, the size of the comparison source data area is assumed to equal that of one physical page for the sake of simplicity (FIG. 26). When the size of the comparison source data area equals that of a plurality of physical pages, for example, the comparison source data area is divisionally processed for each physical page, and the gist of the embodiment does not change.

<When Comparison Source Data Area Exists on SSD Controller>

Figure 27:
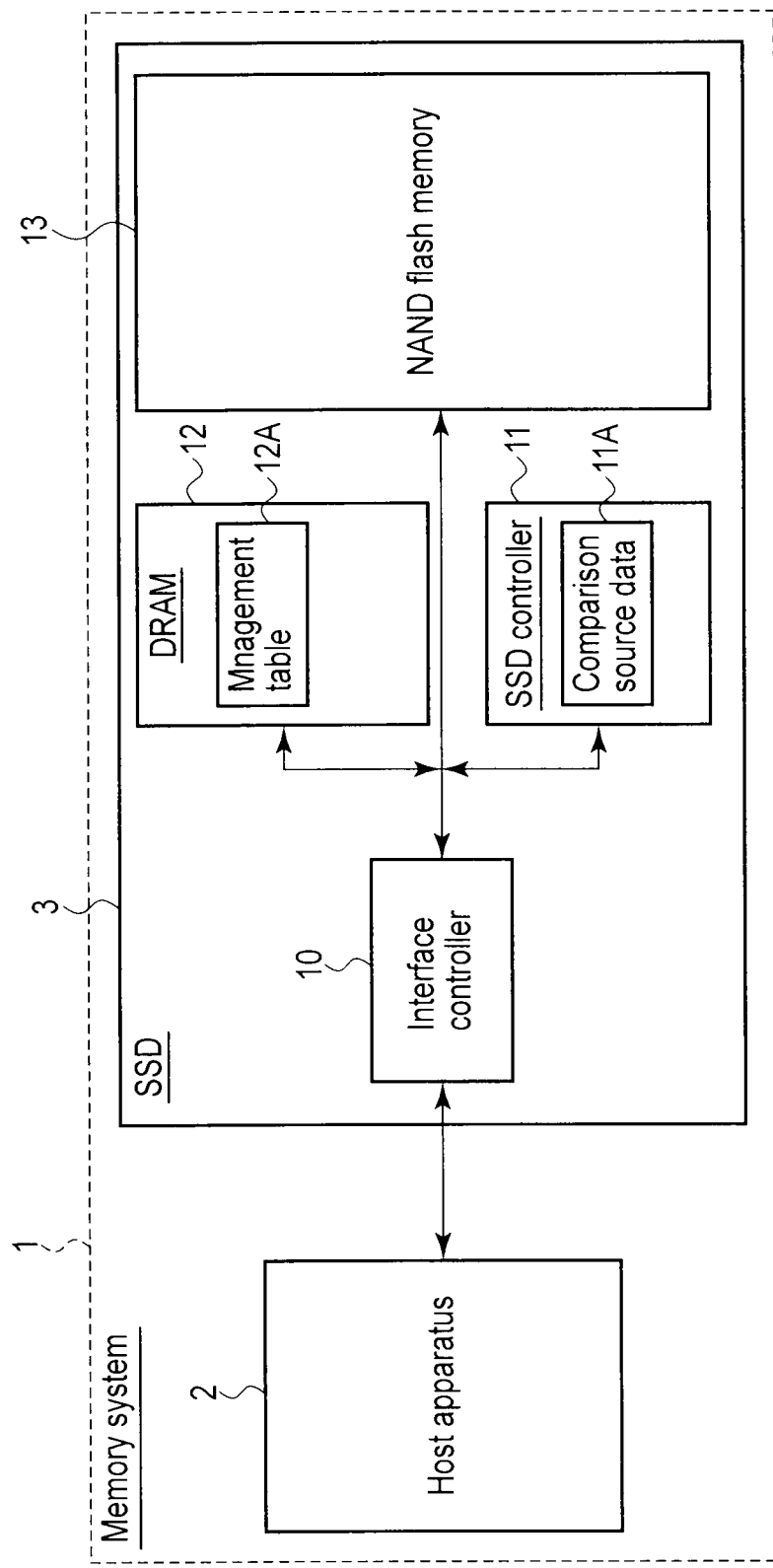
FIG. 27 is a block diagram of a memory system in which the comparison source data area is allocated on an SSD controller.

FIG. 27 is a block diagram of the memory system 1 in which the comparison source data area is allocated on the SSD controller 11.

A storage area 11A (comparison source data area) that stores comparison source data is allocated to an SRAM (or another RAM) or an LSI (or another ROM) on the SSD controller 11. When the storage area 11A is a RAM, the SSD controller 11 reads the backup comparison source data to the storage area 11A upon activating the SSD 3, as in the case of the DRAM. When the storage area 11A is a ROM, initial data such as data filled with "0" is written to the ROM at the time of shipment from the factory.

As shown in FIG. 28, the physical address mapping table method is the same as in the case of the DRAM described above. In this embodiment, the size of the comparison source data area will be assumed to equal that of one physical page hereinafter for the sake of simplicity (FIG. 29).

<When Comparison Source Data Area Exists on NAND Flash Memory>

Figure 30:
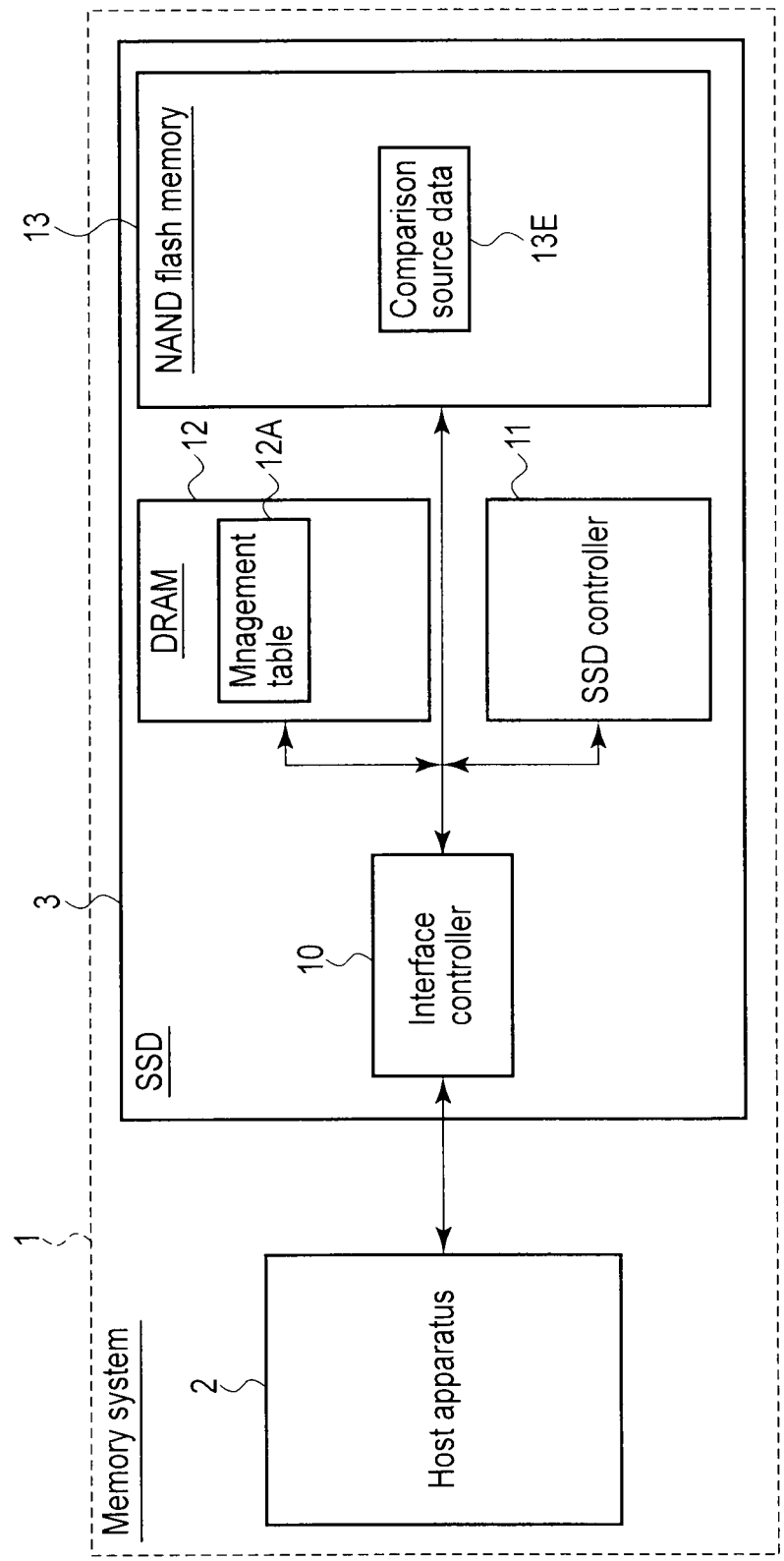
FIG. 30 is a block diagram of a memory system in which the comparison source data area is allocated on an NAND flash memory.

FIG. 30 is a block diagram of the memory system 1 in which the comparison source data area is allocated on the NAND flash memory 13.

The storage area 13E (comparison source data area) that stores comparison source data is allocated to a partial area of the NAND flash memory 13. Initial data such as data filled with "0" is written to the comparison source data area of the NAND flash memory 13 at the time of shipment from the factory.

FIG. 31 is a view for explaining the physical address mapping table. Each physical page of the NAND flash memory 13 is assigned a physical block ID and a physical page address. In addition, part of the physical page group is allocated to the comparison source data area. The data management method, including the management unit, in the comparison source data area is the same as that in the remaining areas on the NAND flash memory 13. The size of the comparison source data area is a natural number multiple of the minimum management unit of the NAND flash memory 13, that is, a natural number multiple of the physical page size in this embodiment. The start address of the comparison source data area equals the start address of one of the physical pages (must not be an address halfway through a physical page). The physical block IDs assigned to the comparison source data area are preferably registered in the active block table in advance at the time of shipment from the factory.

The size of the comparison source data area can be either equal to or larger than that of the physical block of the NAND flash memory 13 or smaller. In this embodiment, the size of the comparison source data area is assumed to equal that of one physical page for the sake of simplicity (FIG. 32). When the size of the comparison source data area equals that of a plurality of physical pages, for example, the comparison source data area is divisionally processed for each physical page, and the gist of the embodiment does not change.

The cases in which the comparison source data area is allocated on the DRAM 12, the SSD controller 11, and the NAND flash memory 13 have been described above. In either case, the comparison source data area undergoes the same physical address mapping as that for the physical pages of a normal NAND flash memory and can be handled in the same manner. Hence, the following explanation is applicable independently of the portion (the DRAM 12, the SSD controller 11, or the NAND flash memory 13) where the comparison source data area is allocated.

The arrangement of a host apparatus 2 will be described below. FIG. 33 is a block diagram of the host apparatus 2. A DRAM 23 includes a storage area 23E that stores comparison source data in place of the function f. The remaining components are the same as in FIG. 3 of the first embodiment.

Upon activating the host apparatus 2 or the optimization program, a CPU 20 of the host apparatus 2 sends a read instruction to the SSD 3 to read comparison source data, and stores the comparison source data read from the SSD 3 in the storage area 23E of the DRAM 23. The read can be done using a read command or any other command such as a command unique to the vendor. Alternatively, the comparison source data may be stored in advance in another external storage device connected to the host apparatus 2 so that the CPU 20 of the host apparatus 2 reads the comparison source data from the external storage device upon activating the host apparatus 2 or the optimization program.

[2. Operation]

<2-1. NAND Arrangement Processing>

Figure 34:
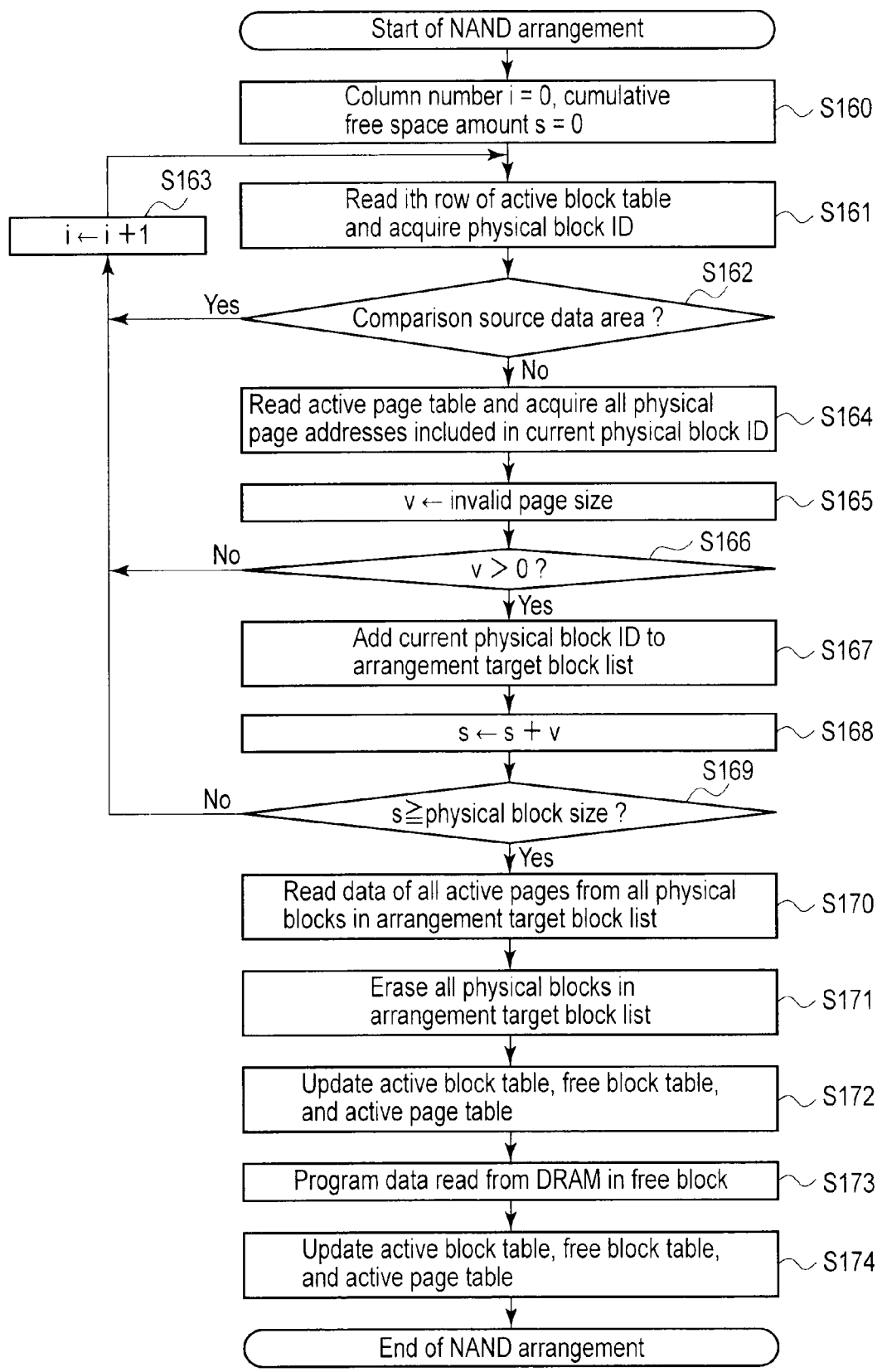
FIG. 34 is a flowchart illustrating NAND arrangement processing of an SSD.

FIG. 34 is a flowchart illustrating NAND arrangement processing of the SSD 3. The SSD controller 11 sets a column number i=0 and a cumulative free space amount s=0 (step S160). The SSD controller 11 reads the first row of the active block table from the DRAM 12, and acquires a physical block ID (step S161). The physical block ID acquired in step S161 will be referred to as a current physical block ID.

The SSD controller 11 determines based on the address mapping in FIG. 26, 29, or 32 whether the current physical block ID includes the comparison source data area (step S162). If the current physical block ID includes the comparison source data area, the SSD controller 11 increments the current physical block ID to shift the operation target to the next physical block ID (step S163). If the current physical block ID does not include the comparison source data area, the SSD controller 11 reads the active page table from the DRAM 12, and acquires all physical page addresses included in the current physical block ID, as in FIG. 8 of the first embodiment (step S164). The comparison source data area is thus excluded from the NAND arrangement target. The comparison source data area is preferably excluded from the NAND arrangement target. However, the comparison source data area may be included in the NAND arrangement target. The subsequent procedure is the same as in FIG. 8 of the first embodiment.

<2-2. Delete Notification Processing>

Delete notification processing of the SSD 3 will be described next. FIG. 35 is a flowchart illustrating the delete notification processing of the SSD 3. The SSD 3 receives a delete notification from the host apparatus 2 (step S180). The delete notification includes a delete command and a logical address.

The SSD controller 11 reads the active page table from the DRAM 12 (step S181). On the active page table, the SSD controller 11 associates the logical address area (delete target logical area) of the delete target designated by the delete notification with the comparison source data area (step S182). In this embodiment, since the size of the comparison source data area equals the size of one physical page, the delete target logical area corresponds to one logical page.

The SSD controller 11 reads the active block table from the DRAM 12 (step S183). Referring to the active block table, the SSD controller 11 deletes a physical block having no physical block ID in the active page table from the active block table, and adds it to the free block table (step S184). The SSD 3 can thus allocate a free block not only by NAND arrangement but also by the delete notification processing.

<2-3. Read Operation>

The read operation of the SSD 3 will be described next. FIG. 36 is a flowchart illustrating the read operation of the SSD 3. The SSD 3 receives a read instruction from the host apparatus 2 (step S190). The read instruction includes a read command and a logical address.

The SSD controller 11 reads the active block table from the DRAM 12 (step S191), and refers to a physical block ID corresponding to the logical address received from the host apparatus 2. The SSD controller 11 reads the active page table (step S192), and reads the corresponding physical address based on the address mapping in FIG. 26, 29, or 32 (step S193). At this time, if the read target is the comparison source data area on the DRAM 12 or the SSD controller 11, the read operation is performed at a high speed, and the read performance is improved. The SSD controller 11 sends the read data to the host apparatus 2 (step S194).

<2-4. Optimization Processing>

Figure 37:
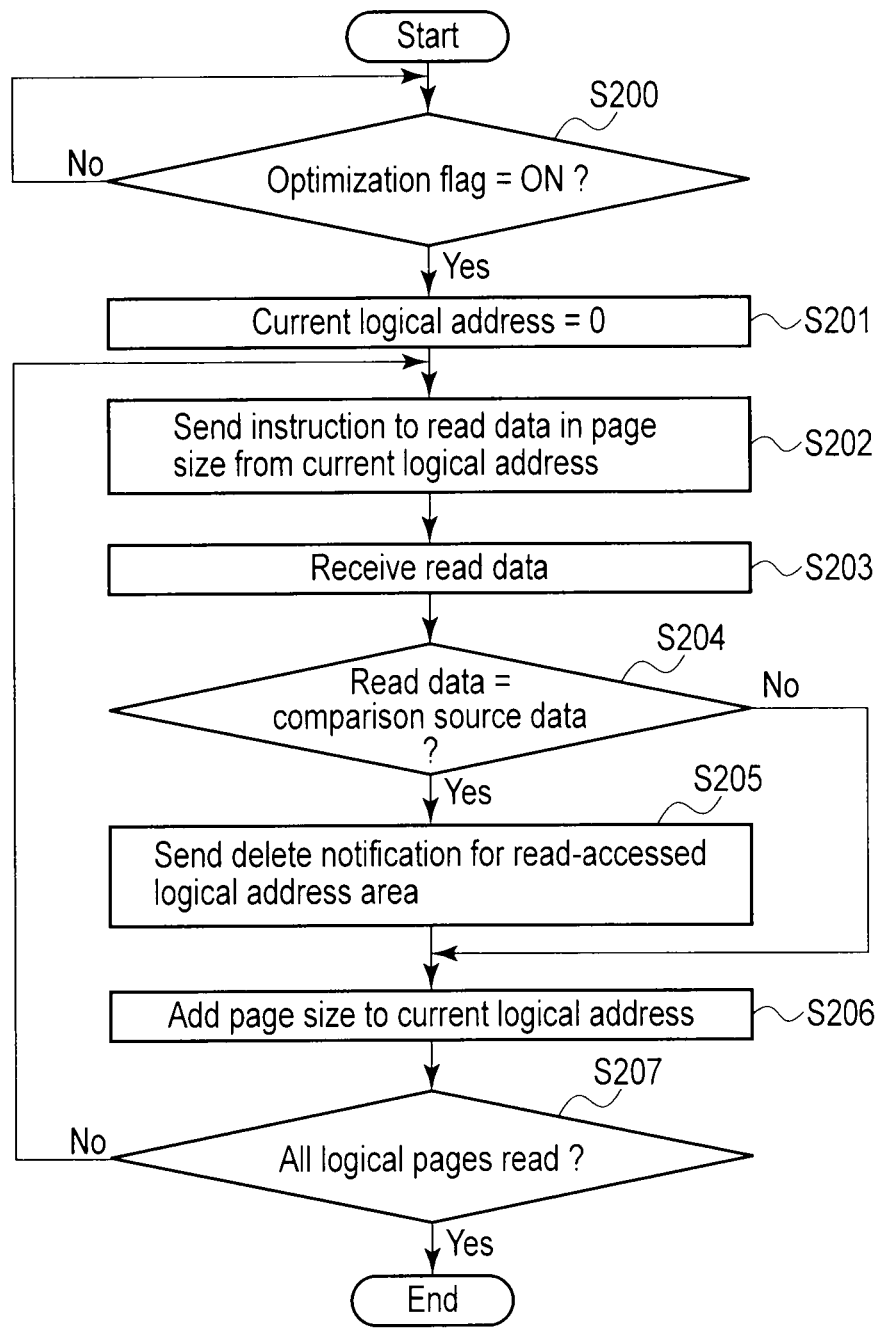
FIG. 37 is a flowchart illustrating optimization processing of the host apparatus.

Optimization processing of the host apparatus 2 will be described next. FIG. 37 is a flowchart illustrating the optimization processing of the host apparatus 2. The optimization flag setting processing is the same as the above-described processing of the host apparatus 2.

The CPU 20 of the host apparatus 2 monitors the optimization flag (step S200). Upon confirming that the optimization flag is ON, the CPU sets the current logical address to 0 (step S201). The CPU 20 sends a read instruction to the SSD 3 to read data in the page size from the current logical address, that is, data of one logical page from the current logical address (step S202). The SSD 3 performs read processing in accordance with the read instruction received from the host apparatus 2, and sends the read data to the host apparatus 2.

The CPU 20 receives the read data of one logical page from the SSD 3 (step S203). The CPU 20 determines whether the read data matches the comparison source data stored in the storage area 23E of the DRAM 23 (step S204). If the read data matches the comparison source data, the CPU 20 sends a delete notification for the read-accessed logical address area (step S205). Accordingly, the SSD 3 performs the above-described delete notification processing.

The CPU 20 adds the page size to the current logical address (step S206). The CPU 20 repeats the processing of steps S202 to S206 until all logical pages are read (step S207). The LBA areas to be optimized can include either all LBA areas or some of the LBA areas.

The logical pages that have undergone the delete notification processing by the optimization processing are associated with the physical addresses of the comparison source data area in the SSD 3. When the host apparatus 2 sends the read instruction to the SSD 3 concerning the logical pages that have undergone the delete notification processing, the comparison source data is received from the SSD 3. Hence, the data in the SSD 3 viewed from the host apparatus 2 is the same as that before the optimization processing. On the other hand, if the comparison source data area exists on the DRAM or the SSD controller on the side of the SSD 3, the comparison source data read operation is performed at a high speed. Hence, the read performance of the logical pages of the delete notification target is higher than that before the optimization processing.

[3. Effects]

According to the seventh embodiment described above in detail, the following effects can be obtained.

The host apparatus 2 sends a delete notification to the SSD 3 concerning the logical address area where the data is the same as the comparison source data out of valid user data on the host apparatus 2 (host-valid data). The logical address as the delete notification target is thus associated with the physical address of the comparison source data area in the SSD 3. The user data that has undergone the delete notification processing is read from the comparison source data area that exists on the DRAM or the SSD controller on the side of the SSD 3, thereby speeding up the user data read operation.

A free block can be allocated by performing the optimization processing. For this reason, after the optimization processing, the performance of the write operation is improved, and degradation of the reliability of the SSD 3 is reduced. The more the data matches the comparison source data in the host-valid user data on the host apparatus 2, the more the effect of this embodiment is enhanced.

[4. Examples]

(Example 1)

The second embodiment may be applied to the seventh embodiment. That is, in Example 1, a file list is acquired by accessing the management area of the OS in the host apparatus, and optimization processing is executed for each file, as in the second embodiment.

Figure 38:
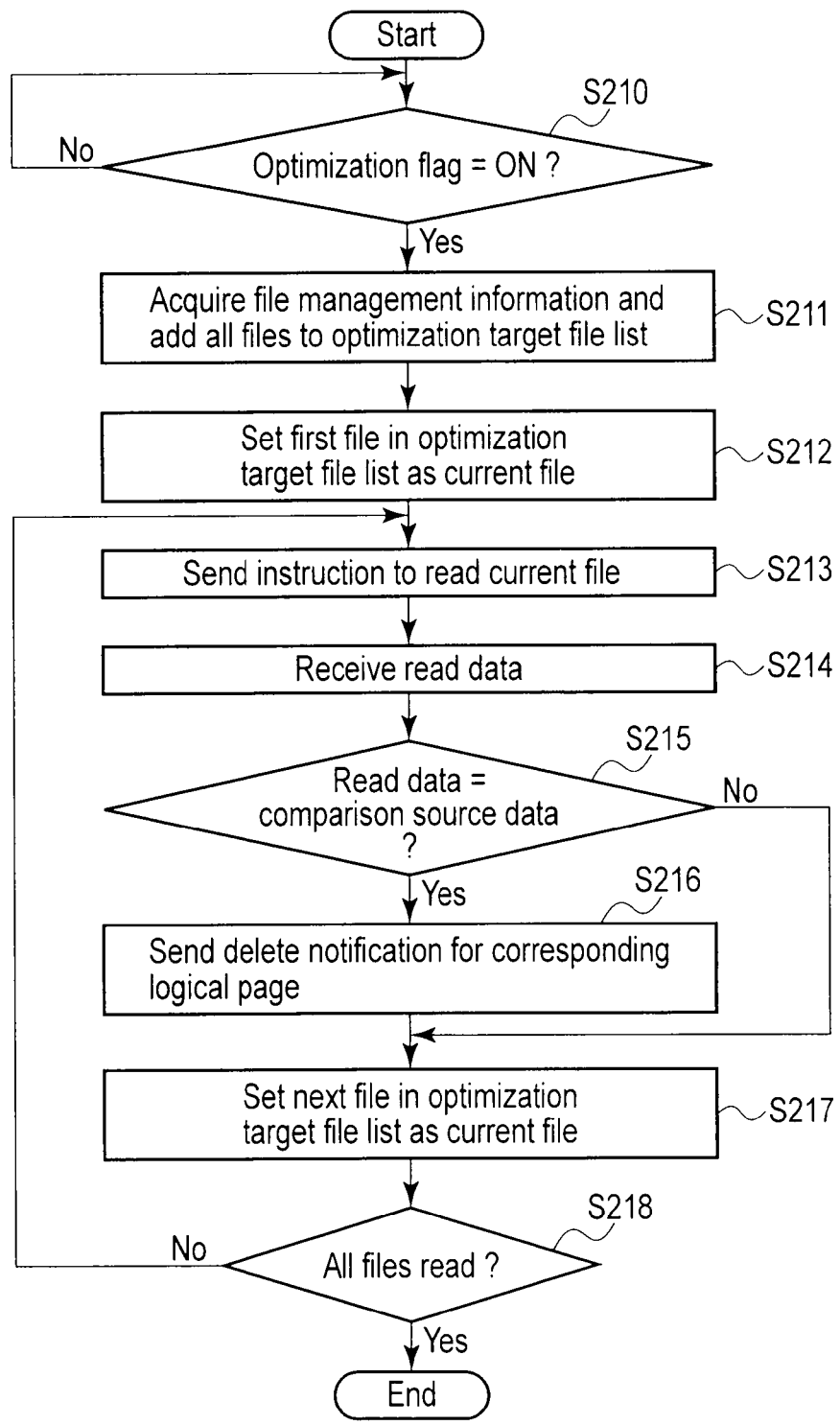
FIG. 38 is a flowchart illustrating optimization processing of a host apparatus according to Example 1.

FIG. 38 is a flowchart illustrating the optimization processing of the host apparatus 2 according to Example 1. The step of receiving read data from the SSD 3 for each file is the same as in FIG. 16 of the second embodiment.

The CPU 20 of the host apparatus 2 determines whether a logical page matching the comparison source data exists in the read file (step S215). If a logical page matching the comparison source data exists, the CPU 20 sends a delete notification for the logical page (step S216). Accordingly, the SSD 3 performs the above-described delete notification processing. The subsequent steps are the same as in FIG. 16 of the second embodiment.

As described above in detail, according to Example 1, the read operation is performed not for the whole logical address space but only for host-valid files on the host apparatus 2 in the optimization processing. Since the data amount of the optimization target can be reduced, the time required for the optimization processing can shorten. This optimization processing can be performed either for all files or for only several files.

(Example 2)

Figure 39:
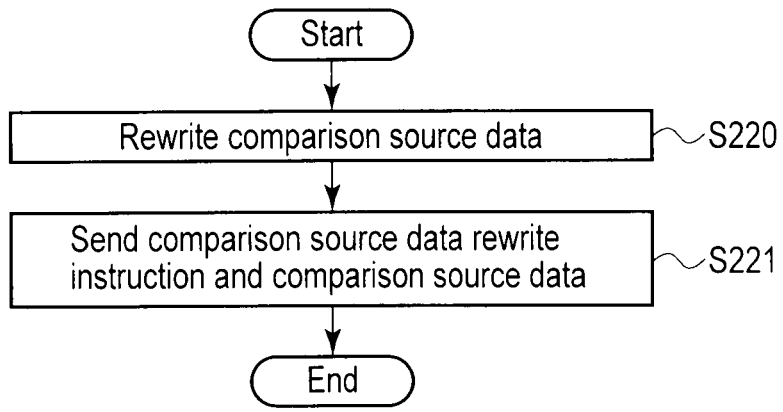
FIG. 39 is a flowchart illustrating comparison source data rewrite processing of a host apparatus according to Example 2.

The comparison source data on the SSD and the comparison source data on the host apparatus may be rewritten after shipment from the factory. FIG. 39 is a flowchart illustrating comparison source data rewrite processing of the host apparatus according to Example 2.

The CPU 20 of the host apparatus 2 rewrites the old comparison source data stored in the storage area 23E of the DRAM 23 to new comparison source data in response to, for example, a user instruction (step S220). The CPU 20 sends a rewrite instruction for comparison source data rewrite and the comparison source data to the SSD 3 (step S221). The rewrite instruction to rewrite the comparison source data can be either a normal write instruction or another instruction such as an instruction unique to the vendor.

Figure 40:
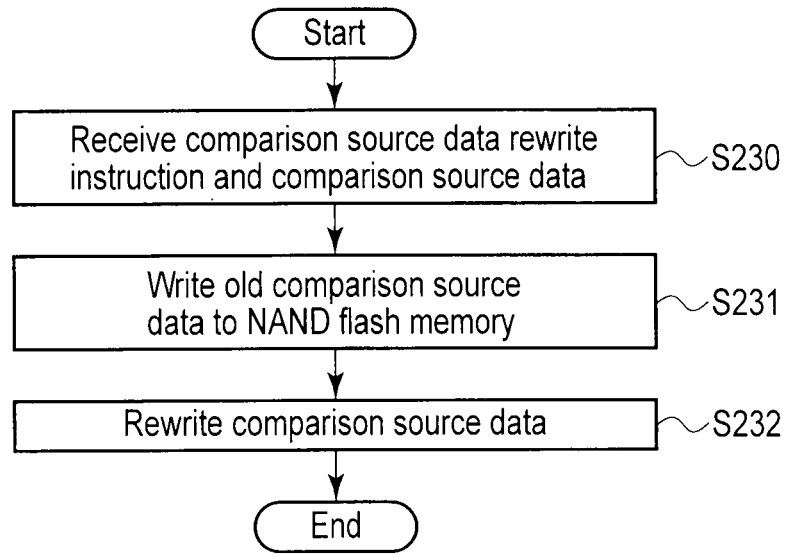
FIG. 40 is a flowchart illustrating comparison source data rewrite processing of an SSD according to Example 2.

FIG. 40 is a flowchart illustrating comparison source data rewrite processing of the SSD 3 according to Example 2. The SSD 3 receives the comparison source data rewrite instruction and the comparison source data from the host apparatus 2 (step S230).

When rewriting the comparison source data on the SSD 3, it is necessary to keep consistency of the data in the NAND flash memory 13. The SSD controller 11 writes the old comparison source data to the logical page associated with the old comparison source data (step S231). For example, the SSD controller 11 makes copies of the old comparison source data in number equal to the logical pages associated with the old comparison source data out of the logical address area of the NAND flash memory 13, and writes the old comparison source data to these logical pages. The SSD controller 11 rewrites the comparison source data area on the NAND flash memory 13 or the DRAM 12 to the new comparison source data (step S232).

In this embodiment, for the sake of simplicity, various kinds of physical addresses are directly associated with the LBAs in the management information. However, as in, for example, U.S. Patent Application Publication No. 2009-0222617, the LBAs may be managed using a management unit that is a natural number (2 or more) multiple of the sector size, and not the LBAs but the correspondence relationship between the management unit and the NAND flash memory may be described in the management information. Like the management unit of LBA, the management information that describes the correspondence relationship between the LBAs and the physical addresses of the NAND flash memory can take various forms. However, details of the form of the table (logical/physical conversion table) that describes the correspondence relationship between the physical addresses and the LBAs do not affect the gist of the embodiment.

In this embodiment, when data received from the host apparatus is written to the NAND flash memory, the data itself (plain text) received from the host apparatus is recorded. However, this embodiment is also applicable even when the plain text is randomized and stored in the NAND flash memory, or encrypted and stored in the NAND flash memory.

[Eighth Embodiment]

In the eighth embodiment, optimization processing concerning the comparison source data described in the seventh embodiment is performed by an SSD 3 itself. The structure of the comparison source data area provided on the SSD 3 is the same as in the seventh embodiment. The comparison source data area of the SSD 3 is allocated on a RAM such as a DRAM or an LSI, a RAM, or a NAND flash memory in the SSD controller. Additionally, in this embodiment, the size of the comparison source data area is assumed to equal that of one physical page for the sake of simplicity, as in the seventh embodiment.

Figure 41:
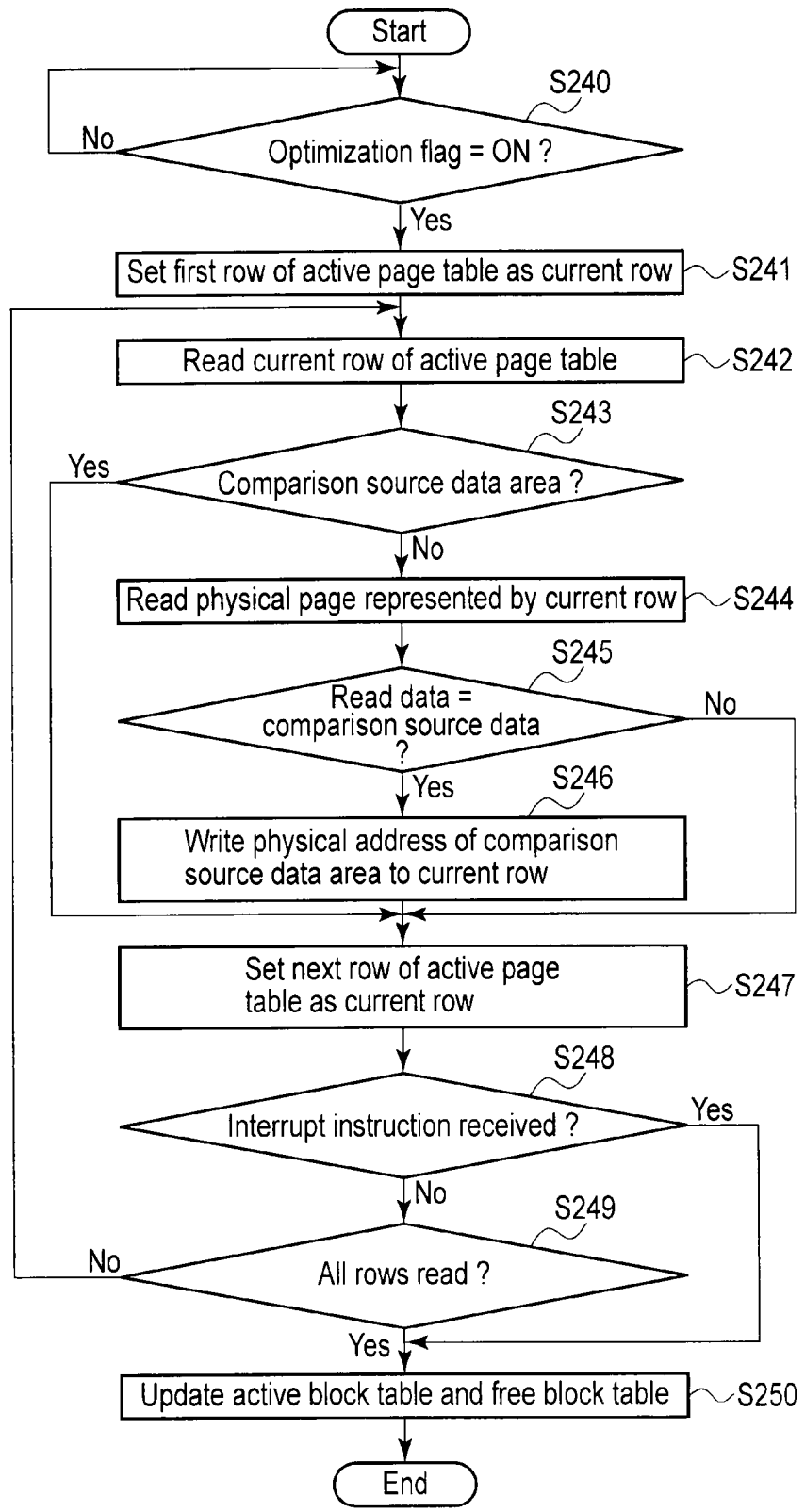
FIG. 41 is a flowchart illustrating optimization processing of an SSD according to the eighth embodiment.

FIG. 41 is a flowchart illustrating the optimization processing of the SSD 3 according to the eighth embodiment. Upon confirming that the optimization flag is ON in a storage area 12C of a DRAM 12 (step S240), an SSD controller 11 sets the first row of the active page table as the current row (step S241). The SSD controller 11 reads the current row of the active page table from the DRAM 12 (step S242).

The SSD controller 11 determines whether the physical address represented by the current row indicates the comparison source data area (step S243). If the physical address represented by the current row indicates the comparison source data area, the optimization processing is not performed for the physical address. If the physical address represented by the current row does not indicate the comparison source data area, the SSD controller 11 reads the physical page represented by the current row from a NAND flash memory 13 (step S244).

The SSD controller 11 determines whether the read data matches the comparison source data (step S245). If the read data matches the comparison source data, the SSD controller 11 writes the physical block ID assigned to the comparison source data area as a pseudo address and the physical page address assigned to the comparison source data area as a pseudo address to the current row of the active page table (step S246). If the read data does not match the data in the comparison source data area, the optimization processing is not performed for the physical page.

After that, the optimization processing is executed for all rows of the active page table, as in FIG. 23 of the sixth embodiment. The optimization processing may be performed for some of the rows. The SSD controller 11 updates the active block table and the free block table (step S250). That is, referring to the active block table, the SSD controller 11 deletes physical blocks having no elements in the active page table out of the areas other than the comparison source data area of the NAND flash memory 13 from the active block table and adds them to the free block table. Note that if the interrupt instruction is urgent, the active block table and the free block table may be updated later.

The read operation and the NAND arrangement operation of the SSD 3 are the same as in the seventh embodiment.

As described above in detail, according to the eighth embodiment, when there exist a plurality of physical pages having the same data as that in the comparison source data area, a plurality of logical addresses (LBAs) are associated with the single comparison source data area by the optimization processing. The physical pages associated with the logical addresses are released. When new free blocks are thus allocated, the performance of the write operation is improved, and degradation of the reliability of the SSD 3 is reduced after the optimization processing.

In a case in which the comparison source data area is allocated on the RAM or the SSD controller, when the host apparatus 2 sends the read instruction to the SSD 3 concerning a logical address associated with the comparison source data area, the read operation is performed faster than the read operation entailing the read processing of the NAND flash memory 13. This allows to improve the read performance. The more the data matches the comparison source data out of the data written to the NAND flash memory 13, the more the effect of this embodiment is enhanced.

Note that the comparison source data on the SSD may be rewritten after shipment from the factory, as in the seventh embodiment. In this case, the SSD controller makes copies of the old comparison source data in number equal to the logical pages associated with the old comparison source data out of the logical address area of the NAND flash memory 13, and writes the old comparison source data to these logical pages. After that, the SSD controller rewrites the comparison source data area on the NAND flash memory 13 or the DRAM 12 to the new comparison source data, thereby preventing inconsistency of the data.

The condition to set the optimization flag is not limited to an explicit instruction from the host apparatus 2. That is, as in the sixth embodiment, the SSD controller may set the optimization flag when no access is received from the host apparatus 2 for a predetermined period (for example, 10 sec). Alternatively, the SSD controller may set the optimization flag when the free block count has fallen below a predetermined value (for example, a predetermined value preset at the time of design).

In this embodiment, for the sake of simplicity, various kinds of physical addresses are directly associated with the LBAs in the management information. However, as in, for example, U.S. Patent Application Publication No. 2009-0222617, the LBAs may be managed using a management unit that is a natural number (2 or more) multiple of the sector size, and not the LBAs but the correspondence relationship between the management unit and the NAND flash memory may be described in the management information. Like the management unit of LBA, the management information that describes the correspondence relationship between the LBAs and the physical addresses of the NAND flash memory can take various forms. However, details of the form of the table (logical/physical conversion table) that describes the correspondence relationship between the physical addresses and the LBAs do not affect the gist of the embodiment.

In this embodiment, when data received from the host apparatus is written to the NAND flash memory, the data itself (plain text) received from the host apparatus is recorded. However, this embodiment is also applicable even when the plain text is randomized and stored in the NAND flash memory, or encrypted and stored in the NAND flash memory. At this time, the data comparison in step S245 is preferably performed for the plain text after decryption. However, the data comparison may be done for the randomized data or encrypted data before description.

[Ninth Embodiment]

In the first to sixth embodiments, optimization processing is performed using the function f(LBA) in the host apparatus (information processing apparatus) or the SSD. In the ninth embodiment, a method of deciding a function f(LBA) at the time of designing the optimization program or the product or before or after shipment from the factory will be described. Especially when the OS to be installed in the SSD or the system configuration is predetermined, the function f(LBA) optimum for the system is preferably set at the time of designing the optimization program or the product or before shipment from the factory.

(Example 1)

FIG. 42 is a view showing examples of logical addresses and data. The logical address area of the SSD is recognized by the host apparatus by the logical addresses (LBAs). The minimum management unit of the logical addresses is one sector. The size of one sector is, for example, 512 bytes. As shown in FIG. 42, logical addresses (0000h, 0001h, 0002h, . . . , ba02h, . . . ) are assigned to the respective sectors.

FIG. 42 illustrates an example of a data pattern written to the SSD before shipment when the OS and other software are preinstalled in a personal computer equipped with the SSD. Alternatively, even if the data is not actually written, the function f(LBA) may be decided in the following way by assuming (simulating) data to be written by the end user.

The SSD is fully formatted, for example, before shipment to write 0 data to all logical address areas.

After that, the OS and other software are installed in the SSD to nonzero data to some sectors (LBA=0000h, 0001h, 0003h, ba02h, etc. in FIG. 42). For each logical address where the write has not been performed, 1-sector long data (0-fill sector) filled with "0" remains written (LBA=0002h, 0004h, 0005h, ba03h, etc. in FIG. 42). All sectors from LBA=ba03h have no data written and remain 0-fill sectors.

When all logical addresses are read and compared with the 0-fill sector, the existence probability distribution of 0-fill sectors as shown in FIG. 43 can be derived. When the total number of 0-fill sectors is divided by the total capacity of all logical address areas at the time of comparison, the net ratio of 0-fill sectors can be derived.

Setting function f(LBA)=000 . . . 0 (fixed value; 0 is repeated for 512 bytes) enables to release blocks corresponding to the total number of 0-fill sectors at maximum and allocate free blocks.

The optimization processing may be performed only when the net ratio of 0-fill sectors is significant (for example, 5% or more). The rewrite of the function f(LBA) may be done only when the net ratio of 0-fill sectors is significant (for example, 5% or more). The criterion for determining whether the ratio of 0-fill sectors is significant is decided, for example, as follows.

(1) The ratio to the total capacity of free blocks, which allows to guarantee that the write response time is equal to or less than a predetermined value (for example, a value presented in the specifications)

(2) The ratio to the total capacity of free blocks, which allows to guarantee that the Write Amplification (WA) is equal to or less than a predetermined value The WA is defined by $$WA=\text{(total size of data written to NAND flash memory)}/\text{(total size of written data transferred from host apparatus to SSD)}$$

or $$WA=\text{(total number of times of block erase)}\times\text{(block size)}/\text{(total size of written data transferred from host apparatus to SSD)}$$

Note that the (total size of data written to NAND flash memory) preferably includes not only user data but also data other than the user data such as management information, ECC redundancy data, metadata, and an encryption key.

(Example 2)

FIG. 44 illustrates an example in which the function f(LBA) is not a fixed value. The repetitive pattern that frequency occurs may change depending on the logical address area so that, for example, a certain data pattern frequently occurs in a given logical address area, and another data pattern frequency occurs in another logical address area. A case in which a number of 0-fill sectors exist in the first-half logical address area, whereas a number of 1-fill sectors (data whose bits are all filled with "1" or f in the hexadecimal notation) exist in the second-half logical address area, as shown in FIG. 44, is examined next.

FIG. 45 shows the existence probability distribution of 0-fill sectors and the existence probability distribution of 1-fill sectors. In this case, changing the function f(LBA) between the two logical address areas by setting, for example, "function f(LBA)=000 . . . 0h (LBA≤c000h) and f(LBA)=111 . . . 1h (LBA≤c000h)" is more preferable than setting function f(LBA)=000 . . . 0 (fixed value) or f(LBA)=111 . . . 1 (fixed value) because more sectors can be released.

(Example 3)

Figures 46, 47:
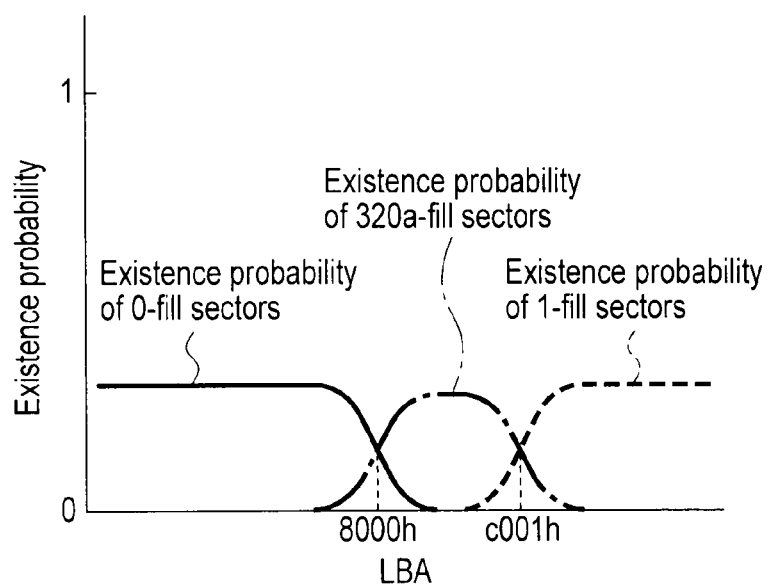
FIG. 46 is a view showing an example of logical addresses and data according to Example 3.
FIG. 47 is a graph showing the existence probability distributions of three kinds of data patterns.

FIG. 46 shows a case in which the data that frequency occurs changes among three logical address areas. FIG. 47 shows the existence probability distribution of 0-fill sectors, the existence probability distribution of 320a-fill sectors (1-sector long data filled with 320a), and the existence probability distribution of 1-fill sectors. In this case, changing the function f(LBA) among the three logical address areas by setting, for example, "function f(LBA)=000 . . . 0h (LBA≤7fffh), function f(LBA)=320a320a . . . 320ah (8000≤h LBA≤c000h), and f(LBA)=111 . . . 1h (LBA≤c001h)" is more preferable because more sectors can be released.

(Example 4)

Example 4 uses a management unit corresponding to the logical address area divided by a size L. The size L is equal to or larger than the minimum unit of the LBA. The function f(LBA) has a predetermined value within each management unit but may change between the management units. For example, function f(LBA)=D0 (fixed value) in the first management unit, function f(LBA)=D1 (fixed value) in the second management unit, . . . . In this case, the function f(LBA) is represented by "f(LBA)=D0 (0≤LBA≤L−1), f(LBA)=D1 (L≤LBA≤2L−1), f(LBA)=D2 (2L≤LBA≤3L−1), . . . , f(LBA)=Dk (kL≤LBA≤(k+1)L−1), . . . "

Dk (k=0, 1, . . . ) is an arbitrary data pattern having the size L.

The manner Dk (k=0, 1, . . . ) is selected is arbitrary. The optimum function f(LBA) is decided by selecting optimum Dk. An SSD pre-shipment inspection instrument, the CPU of the information processing apparatus, or the SSD controller calculates the score in accordance with the following procedure.

(1) Data of each kind of sector is read (alternatively, data may be read for every integer multiple of sectors or for each management unit)

(2) It is determined whether the data read in (1) equals the function f(LBA) (when data is read for every integer multiple of sectors, it is determined whether all sectors in each section equal the function f(LBA))

(3) If the data equals the function, 1 point is awarded, and otherwise, 0 points are awarded.

(4) The score calculation is done for all logical address areas of the SSD, and the total score is calculated.

Dk of the highest score is the optimum. The optimum function f(LBA) is decided using this Dk. For example, when L=128 MiB (MiB=1,048,576 bytes), all logical address areas of the SSD are equally divided by 128 MiB from the start point. Each section is read-accessed. It is determined whether all data in each section equals the function f(LBA). If the data equals the function, 1 point is added, and the total score is calculated. This score calculation is executed for a plurality of candidates such as (D0, D1, . . . )=(0000 . . . , 0000 . . . , . . . ), (FFFF . . . , FFFF . . . , . . . ), (FFFF . . . , 0000 . . . , . . . ), (0000 . . . , FFFF . . . , . . . ), . . . . The candidate having the highest score is selected as optimum (D0, D1, . . . ) to decide the function f(LBA).

(Example 5)

In Example 4, a section divided into a fixed length is used as the management unit. Instead, a section divided into a variable length may be used as the management unit. In this case, the function f(LBA) is represented by "f(LBA)=D0   ($L_0$=0≤LBA≤$L_1$−1),   f(LBA)=D1 ($L_1$≤LBA≤$L_2$−1), f(LBA)=D2 ($L_2$≤LBA≤$L_3$−1), . . . , f(LBA)=Dk ($L_k$≤LBA≤$L_{(k+1)}$−1), . . . "

Dk (k=0, 1, . . . ) is an arbitrary data pattern having a size L, and "$L_0$<$L_1$<$L_2$< . . . $L_k$< . . . ."

(Example 6)

Example 6 shows a case in which data and the LBAs have a predetermined correlation although no sufficient effect can be obtained by applying the above-described method because there are few sectors filled with the same data (FIG. 48). In this case, a more general method of deciding the function f(LBA) is preferably used. For example, a plurality of candidates of the function f(LBA) are prepared. The above-described score calculation is done for each function f(LBA). The function f(LBA) having the highest score is decided as the optimum function f(LBA). In Example 6, sectors whose data have a predetermined correlation with the LBAs are released, as shown in FIG. 49.

(Example 7)

For example, for two parameters a and b, "function f(LBA)=a×LBA+b" is defined. Functions prepared by changing the parameters a and b are used as the candidates of the function f(LBA). Then, (a,b) having the highest score may be obtained, and the function f(LBA) may be decided using the (a,b) having the highest score.

FIG. 50 is a graph for explaining a method of deciding the function f(LBA) according to Example 7. FIG. 50 shows a case in which the parameter b is set to b1, b2, and b3. When the parameter a changes, (a,b)=(a0,b2) has the highest score. Hence, "function f(LBA)=a0×LBA+b2" is calculated.

When the LBA is a 48-bit LBA that is common in the SATA standard, the LBA may be defined as a vector having 48 columns, LBA =(d0, d1, d2, . . . , d47)t (t is the transpose symbol), A as a 512×48 matrix, and b as a vector having 4,096 columns (1 sector=512 bytes=4096 bits). The function f(LBA) may thus be acquired as a vector having 4,096 columns, "function f(LBA)=A×LBA+b". In this case, the correspondence relationship holds between the first column of the vector f(LBA) and the first bit data, between the second column and the second bit data, . . . .

Alternatively, when the LBA is described by n bits, the LBA may be defined as a vector having n columns, LBA=(d0, d1, d2, . . . , dn−1)t, A as an n×m matrix, and b as a vector having m columns. The function f(LBA) may thus be acquired as a vector having m columns, "function f(LBA)=A×LBA+b".

Processing of the controller described in the above embodiments can also be implemented by a program. As the flowchart of the program, the flowcharts described in the above embodiments are usable. That is, the above embodiments may be implemented as a computer-readable medium that records the program.

In the above embodiments, an SSD has been exemplified as the nonvolatile storage device 3. However, the embodiments are widely applicable to nonvolatile storage devices other than the SSD, for example, a hard disk drive (HDD) using a magnetic medium (platter) and a hybrid hard disk drive (hybrid HDD) using both a NAND flash memory and a magnetic medium (platter).

Various forms are considerable as the place where the optimization program described in the above embodiments is stored. For example, the optimization program 13B is stored in the NAND flash memory 13 of the SSD 3 in the power-off state of the host apparatus 2, and loaded from the NAND flash memory 13 to the DRAM 23 upon activating the host apparatus 2 or the program, as shown in FIG. 51.

When a plurality of external storage devices are connected to the host apparatus 2, an optimization program 101 may be stored in another external storage device (SSD or HDD) 100 different from the SSD 3, and loaded from the external storage device 100 to the DRAM 23 upon activating the host apparatus 2 or the program, as shown in FIG. 52. Especially, when the external storage device 100 is used as a system drive that stores the OS, and the SSD 3 is used as a data drive that stores user data such as documents, still image data, and moving image data, the optimization program 101 is preferably stored in the external storage device 100 serving as the system drive from the viewpoint of distinctively imparting functions to the drives 3 and 100 so as to use the system drive 100 as a drive that mainly stores the OS and application programs, and the data drive 3 as a drive that stores user data.

From the viewpoint of saving the user from having to set-up the optimization program, it is preferable that, for example, the optimization program is stored in the SSD 3 or the external storage device 100, as shown in FIG. 51 or 52, and in this state, the memory system 1 is shipped, put on sale, and supplied to the user. On the other hand, from the viewpoint of allowing the user to select whether to install the optimization program and making it possible to provide the latest optimization program to the user, the optimization program is preferably stored in the SSD 3 or the external storage device 100 by download from the WEB or installation from an external storage medium such as a DVD-ROM or a USB memory.

FIG. 53 illustrates a configuration example in which the optimization program is downloaded from the WEB. An optimization program 104 is stored in a storage medium (SSD or HDD) 103 in a WEB server 102 and downloaded from a network such as the Internet, a local network, or a wireless LAN to the SSD 3 via, for example, the LAN controller 27 (in FIG. 53, the optimization program is downloaded to the external storage device 100).

FIG. 54 illustrates a configuration example in which the optimization program is installed from an optical medium such as a DVD-ROM or a CD-ROM. An optimization program 106 is stored in an optical medium 105 such as a DVD-ROM or a CD-ROM. When the optical medium 105 is set in the optical drive 31, the optimization program 106 is installed in the SSD 3 (or the external storage device 100) via the optical drive 31.

Figure 55:
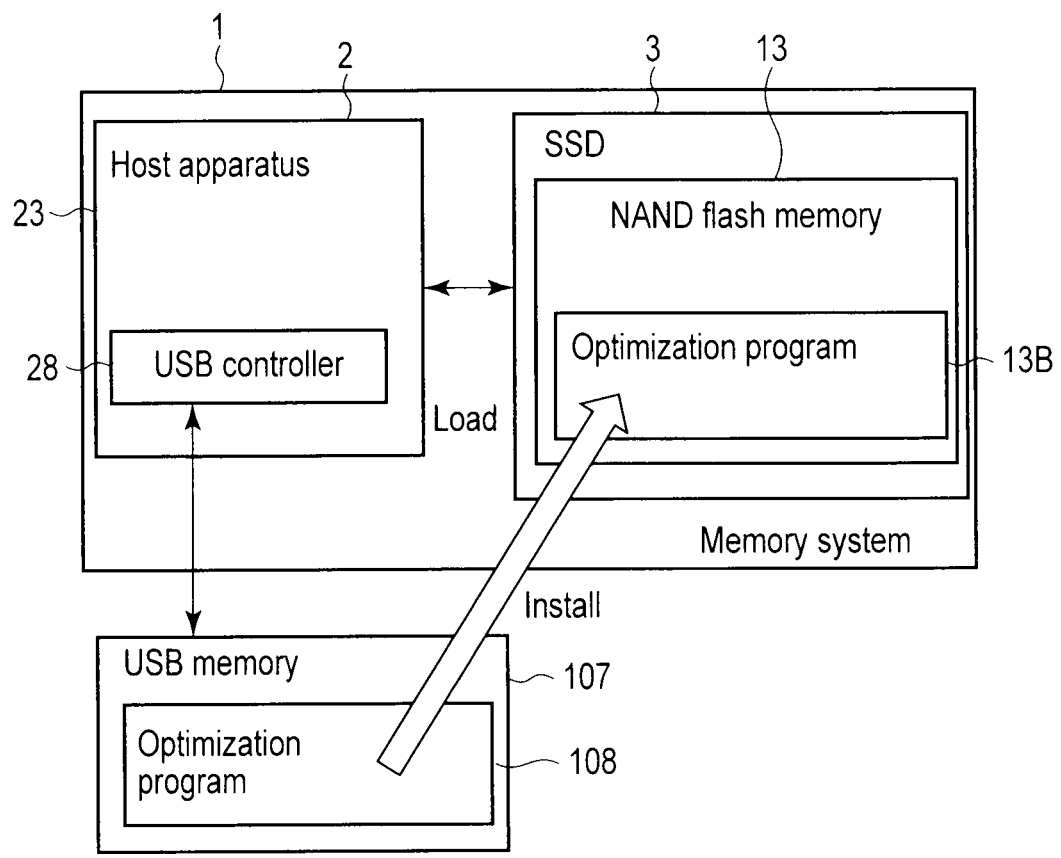
FIG. 55 is a block diagram for explaining an optimization program storage form.

FIG. 55 illustrates a configuration example in which the optimization program is installed from a USB memory. An optimization program 108 is stored in a USB memory 107. When the USB memory 107 is connected to the USB controller 28, the optimization program 108 is installed in the SSD 3 (or the external storage device 100) via the USB controller 28. Not the USB memory 107 but another external memory such as an SD card® may be used, as a matter of course. From the viewpoint of availability for the user, the optical medium 105 or the USB memory 107 is preferably packaged together with the SSD 3 as an accessory at the time of shipment of the SSD 3. The optical medium 105 or the USB memory 107 may be attached as an extra to a magazine or a book.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
a nonvolatile storage unit and an information processing apparatus that communicates with the nonvolatile storage unit,
the nonvolatile storage unit comprising:
a nonvolatile storage medium; and
a first control unit configured to invalidate one or more mappings from a logical address region specified by a received delete notification to the nonvolatile storage medium, and to transmit data indicated by a first function to the information processing apparatus when a logical address region specified by a received read command is not mapped to the nonvolatile storage medium, and
the information processing apparatus comprising a second control unit configured:
to read data from a first logical address region of the nonvolatile storage unit,
to determine whether data read from the first logical address region is identical with the data indicated by the first function, and
to send the delete notification to the nonvolatile storage unit to invalidate one or more mappings from the first logical address region to the nonvolatile storage medium when the read data is identical with the data indicated by the first function.

2. The system of claim 1, wherein the first function indicates fixed data independent from logical addresses sent to the nonvolatile storage unit.

3. The system of claim 1, wherein
the nonvolatile storage medium includes a storage area that stores the first function, and
the second control unit rewrites the first function in the storage area to a second function, and
writes the data expressed by the first function to a second logical address region where read data read from the nonvolatile storage unit is same as the data indicated by the first function.

4. The system of claim 1, wherein the second control unit executes processing concerning the delete notification upon receiving an instruction from a user.

5. The system of claim 1, wherein the second control unit executes processing concerning the delete notification when a predetermined time has been reached.

6. The system of claim 1, wherein
the first control unit sends an instruction to execute processing concerning the delete notification to the information processing apparatus, and
the second control unit executes the processing concerning the delete notification upon receiving the instruction from the nonvolatile storage unit.

7. The system of claim 1, wherein the first function indicates different data for at least two different logical addresses sent to the nonvolatile storage unit.

8. A nonvolatile storage unit that communicates with an information processing apparatus, comprising:
a nonvolatile storage medium; and
a control unit configured:
to read data from a logical address region of the nonvolatile storage medium,
to determine whether the data read from the logical address region is identical with data indicated by a first function,
to invalidate one or more mappings from the logical address region to the nonvolatile storage medium when the read data is identical with the data indicated by the first function, and
to send data indicated by the first function to the information processing apparatus when one or more mappings from a logical address region included in a read command received from the information processing apparatus to the nonvolatile storage medium is invalid.

9. The unit of claim 8, wherein the first function indicates fixed data independent from logical addresses received from the information processing apparatus.

10. The unit of claim 8, wherein the control unit executes processing of invalidating mappings when no access is received from the information processing apparatus during a predetermined period.

11. The unit of claim 8, wherein the control unit executes processing of invalidating mappings upon receiving an instruction from the information processing apparatus.

12. The unit of claim 8, wherein the control unit executes processing of invalidating mappings when a free block count in the nonvolatile storage medium has fallen below a predetermined value.

13. The unit of claim 8, wherein the first function indicates different data for at least two different logical addresses received from the information processing apparatus.

14. An information processing system comprising:
a nonvolatile storage unit and an information processing apparatus that communicates with the nonvolatile storage unit,
the nonvolatile storage unit comprising:
a nonvolatile storage medium;
a storage area configured to store first data; and
a first control unit configured to invalidate one or more mappings from a logical address region specified by a received delete notification to the nonvolatile storage medium, and to transmit the first data to the information processing apparatus when a logical address region specified by a received read command is not mapped to the nonvolatile storage medium; and the information processing apparatus comprising a second control unit configured:

to read data from a first logical address region of the nonvolatile storage unit, to determine whether data read from the first logical address region is identical with the first data, and to send the delete notification to the nonvolatile storage unit to invalidate one or more mappings from the first logical address region to the nonvolatile storage medium when the read data is identical with the first data.

15. The system of claim 14, wherein the first data indicates fixed data independent from logical addresses sent to the nonvolatile storage unit.

16. The system of claim 14, wherein the first data indicates different data for at least two different logical addresses sent to the nonvolatile storage unit.

17. A nonvolatile storage unit that communicates with an information processing apparatus, comprising:

a nonvolatile storage medium;

a storage area configured to store first data; and a control unit configured:

to read data from a logical address region of the nonvolatile storage medium, to determine whether the data read from the logical address region is identical with the first data, to invalidate one or more mappings from the logical address region to the nonvolatile storage medium when the read data is identical with the first data, and to send the first data to the information processing apparatus when one or more mappings from a logical address region included in a read command received from the information processing apparatus to the nonvolatile storage medium is invalid.

18. The unit of claim 17, wherein the first data indicates fixed data independent from logical addresses received from the information processing apparatus.

19. The unit of claim 17, wherein the first data indicates different data for at least two different logical addresses received from the information processing apparatus.

20. The unit of claim 17, wherein the control unit executes processing of invalidating mappings when a free block count in the nonvolatile storage medium has fallen below a predetermined value.

* * * * *